(12) United States Patent
Warr et al.

(10) Patent No.: US 6,975,786 B1
(45) Date of Patent: Dec. 13, 2005

(54) OPTICAL SWITCHING WITH FERROELECTRIC LIQUID CRYSTAL SLMS

(75) Inventors: Steven Warr, Reading (GB); Kim Leong Tan, San Jose, CA (US); William Crossland, Harlow (GB); Ilias Manolis, Olympias Hleias (GR); Maura Redmond, Girton (GB); Timothy Wilkinson, Cambridge (GB); Melanie Holmes, Cambridge (GB); Brian Robertson, Hove (GB)

(73) Assignee: Thomas Swan & Co. Ltd., Durham (GB)

( * ) Notice: Subject to any disclaimer, the term of this patent is extended or adjusted under 35 U.S.C. 154(b) by 116 days.

(21) Appl. No.: 10/110,031

(22) PCT Filed: Oct. 4, 2000

(86) PCT No.: PCT/GB00/03810

§ 371 (c)(1),
(2), (4) Date: Sep. 26, 2002

(87) PCT Pub. No.: WO01/25848

PCT Pub. Date: Apr. 12, 2001

(30) Foreign Application Priority Data

Oct. 4, 1999 (GB) .................................... 9923428

(51) Int. Cl.[7] ............................. G02B 6/35; G02B 5/32; G02B 27/46
(52) U.S. Cl. ............................. 385/17; 359/15; 359/559
(58) Field of Search ............................. 385/15–18, 37, 385/39; 359/15, 19, 20, 559–561

(56) References Cited

U.S. PATENT DOCUMENTS

| 4,952,010 A | * | 8/1990 | Healey et al. ................. 359/11 |
| 5,416,616 A | * | 5/1995 | Jenkins et al. ................. 359/11 |
| 5,497,433 A | * | 3/1996 | Itoh et al. .................... 382/211 |
| 5,539,543 A | | 7/1996 | Liu et al. ....................... 359/15 |
| 5,930,012 A | | 7/1999 | Mears et al. .................... 359/15 |
| 6,172,778 B1 | * | 1/2001 | Reinhorn et al. ............. 359/15 |
| 6,714,339 B2 | * | 3/2004 | Gosselin et al. ............ 359/291 |

FOREIGN PATENT DOCUMENTS

| JP | 06027501 | 4/1994 | ............. G02F 1/31 |

OTHER PUBLICATIONS

O'Brien, D.C., et al., "A holographically routed optical crossbar: theory and simulation", Optical Computing & Processing, vol. 1, No. 3, Jul./Sep. 1991, pp. 233-243.

Mears, Robert J., et al., "Telecommunications Applications of Ferroelectric Liquid-Crystal Smart Pixels", IEEE Journal of Selected Topics in Quantum Electronics, vol. 2, No. 1, Apr. 1996, pp. 35-46.

* cited by examiner

*Primary Examiner*—John D. Lee
(74) *Attorney, Agent, or Firm*—Allston L. Jones

(57) ABSTRACT

An optical switch uses two ferroelectric liquid crystal spatial light modulators (10, 11) with an interconnect region in between. The switch uses bulk lenses (2, 8) to focus light from an input fibre array (1) to a first spatial light modulator (10), and from the second spatial light modulator (11) to an output array (9). Each spatial light modulator displays a respective hologram selected from a previously calculated set, to cause a desired switching of light from the input fibre array to the output array.

30 Claims, 8 Drawing Sheets

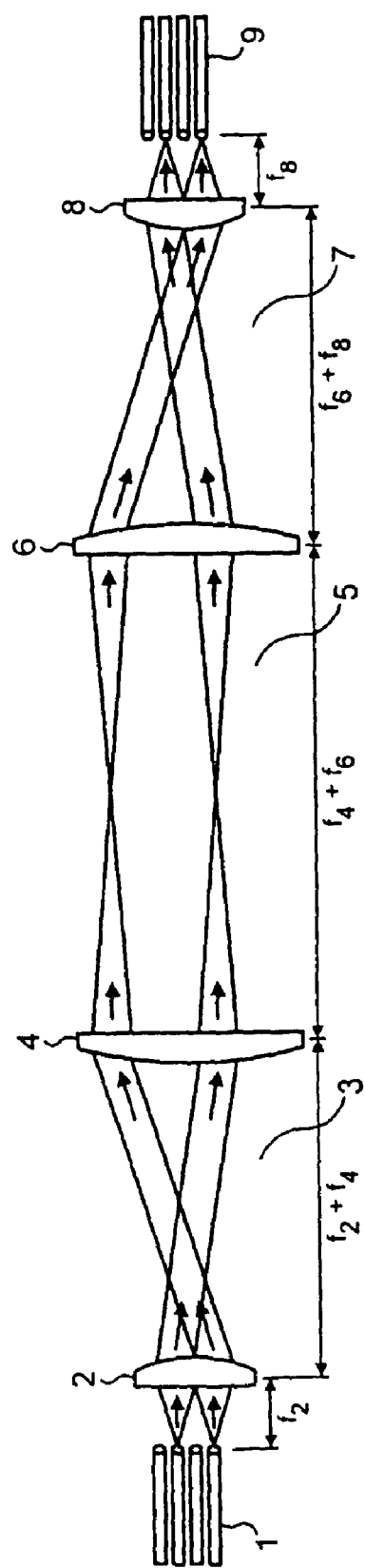
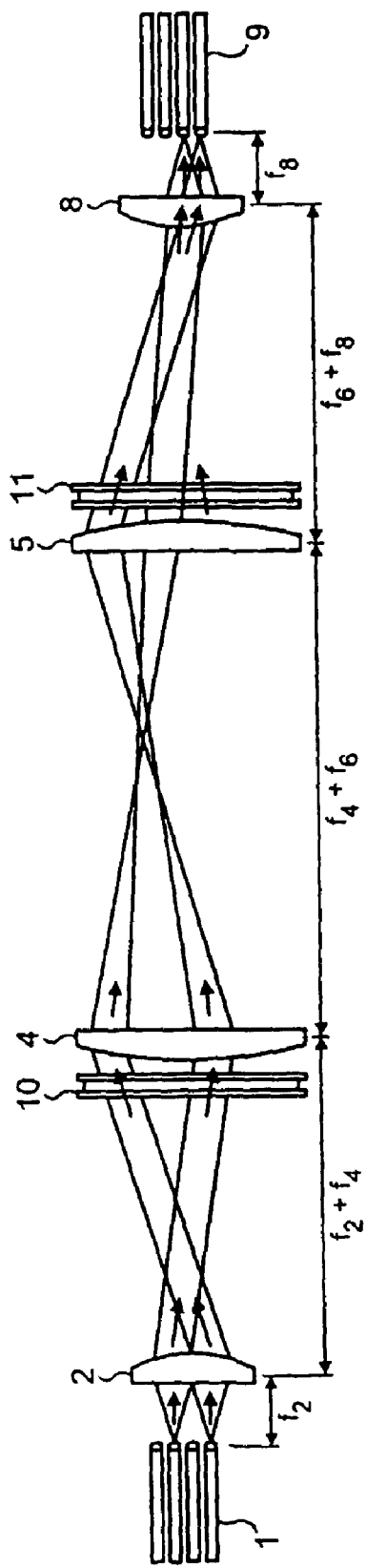
FIG. 1
FIG. 2

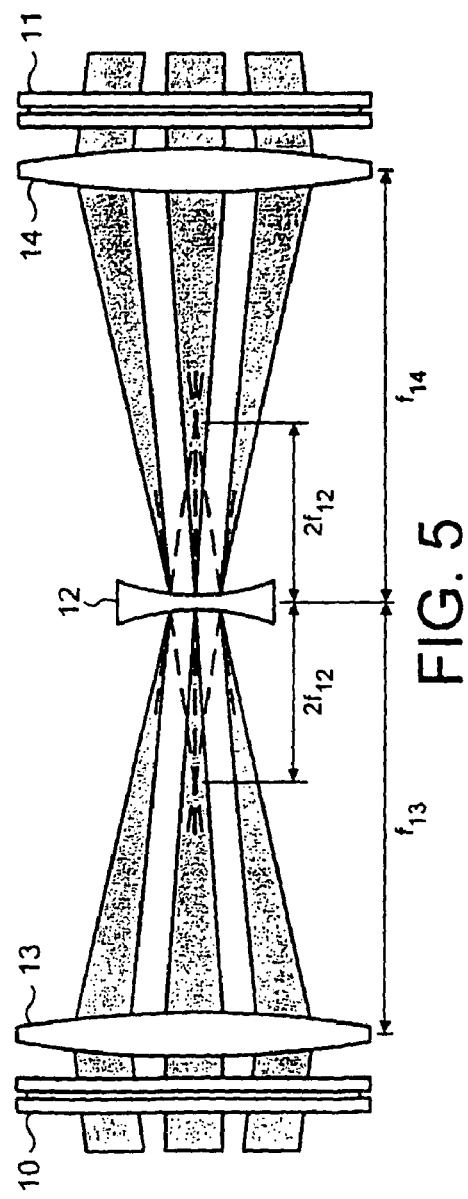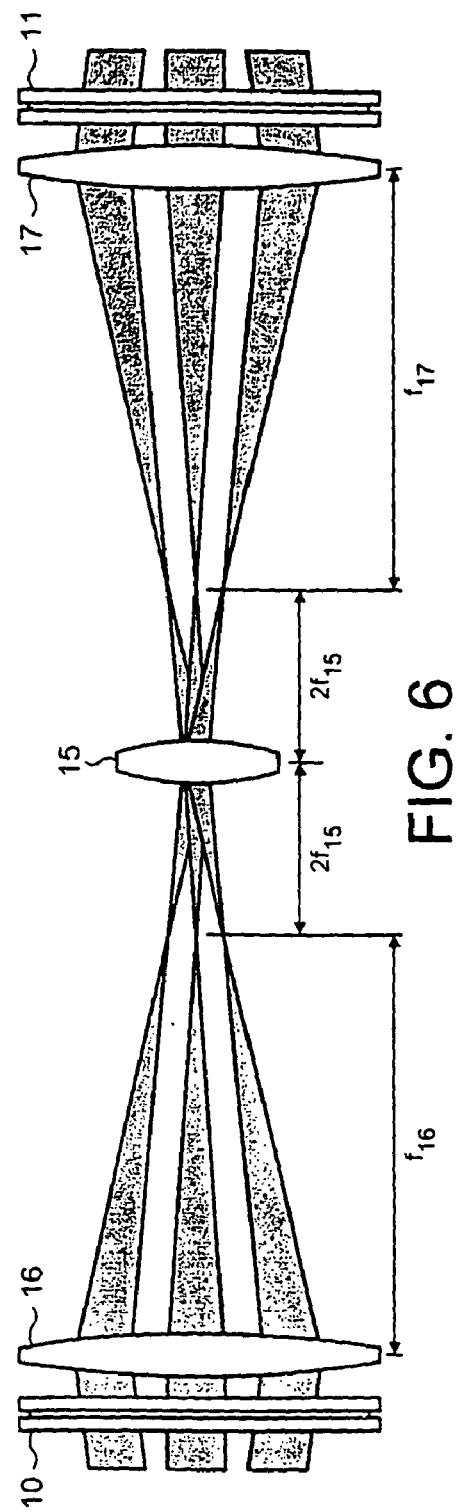

OPTICAL SWITCHING WITH FERROELECTRIC LIQUID CRYSTAL SLMS

This application claims priority from PCT/GB00/03810 filed Oct. 4, 2000, which claims priority from UK patent application number 9923428.8 filed Oct. 4, 1999.

FIELD OF THE INVENTION

The present invention relates to generally to the field of optical switching, and more particularly to switching capable of selective connection between an array of input elements and an array of output elements using ferroelectric liquid crystal spatial light modulators.

BACKGROUND OF THE INVENTION

The development of optical fibre switching components is vital to the continued growth of global information systems. Single-stage matrix switches operating independently of the optical bit-rate and modulation formats, capable of reconfigurably interconnecting N optical inputs to M optical outputs (where N and M are generally, but not necessarily the same number), are particularly desirable.

Some prior art switches are limited in functional size to less than 64×64. Others suffer from relatively poor noise performance.

One useful known configuration is described later herein with respect to FIG. 15. This switch, which uses static holograms provides a static optical switch in which the input signals are "hard-wired" to specific outputs. Adapting the device of FIG. 15 to use reconfigurable holograms as elements for deflecting optical beams in free-space between arrays of optical inputs and optical outputs provides a reconfigurable switch by means of displaying hologram patterns on a spatial light modulator.

There are, however, some practical design problems associated with the migration from a static optical shuffle to a reconfigurable switch.

One problem which has failed to be successfully addressed is that of crosstalk, and another at least partly allied problem is that of insertion losses. Crosstalk occurs when light that was intended to follow one path instead has a component that follows another path. The insertion loss issues are linked to imperfections in the hologram displaying device and to the use of microlenses, which are difficult and expensive to produce, as well as being of questionable accuracy and poor reproducibility. Both of these defects lead to crosstalk. The hologram displaying devices used in reconfigurable hologram switches have been found to be less than perfect, in that they allow beams of direct light to pass through when a deviation was required instead. Clearly the direct component (referred to herein also as "zero order" light) gives rise to crosstalk.

A third problem is making the switch polarisation insensitive, since the polarisation of the light passing through an optical network, and especially through optical fibres fluctuates, for example with time. It has been established that ferroelectric liquid crystal SLMs can be made to operate in a polarisation insensitive manner.

These effects can be addressed by selection of the holograms. However state of the art techniques for production of holograms are not adequate for the required performance.

It is a primary object of the present invention to provide an optical switch using reconfigurable hologram devices which at least partly overcomes the problems of the state of the art.

SUMMARY OF THE INVENTION

According to a first aspect of the present invention there is provided an optical switch comprising an input optical fibre array and a receiver array, and an optical system connecting the input optical fibre array to the receiver array wherein the optical system comprises a first bulk lens for receiving light from the input optical fibre array, a first ferroelectric liquid crystal spatial light modulator, a second ferroelectric liquid crystal spatial light modulator, each spatial light modulator being adapted for providing a respective selectable set of holograms, an interconnect region between said first and second ferroelectric liquid crystal spatial light modulators, and a second bulk lens providing output light to the output array.

In one embodiment, the optical switch further comprises a pair of lenses disposed respectively between said first bulk lens and the first spatial light modulator, and between the second spatial light modulator and the second bulk lens.

In another embodiment, the optical switch further comprises a pair of lenses disposed between said spatial light modulators to define there between said interconnect region.

In a first class of embodiments, said spatial light modulators are transmissive.

In one embodiment of said first class, the first bulk lens is disposed to provide a plurality of collimated light beams from said input optical fibre array, said pair of lenses comprises a second lens and a third lens, said second lens for receiving said collimated light beams and providing a corresponding plurality of mutually parallel beams and said third lens being disposed for receiving said mutually parallel beams and collimating said beams, and said second bulk lens is a fourth lens being disposed for focussing said beams onto said receiver array.

In a second embodiment of said first class, the first bulk lens is disposed to provide a plurality of collimated light beams from said input optical fibre array, said pair of lenses comprises a second lens and a fourth lens, the said second lens for receiving said collimated light beams and providing a corresponding plurality of mutually convergent beams, the optical system further comprising a third lens having a negative power, receiving said convergent beams and providing mutually divergent output beams, and the fourth lens being disposed for receiving said mutually divergent beams and collimating said beams wherein said second bulk lens is a fifth lens being disposed for focussing said beams onto said receiver array.

This second embodiment has the advantage of allowing path length reduction by comparison with the above-discussed first embodiment.

In a third embodiment of said first class, the first bulk lens is disposed to provide a plurality of collimated light beams from said input optical fibre array, said pair of lenses comprises a second lens and a fourth lens, the said second lens for receiving said collimated light beams and providing a corresponding plurality of mutually convergent beams, the optical system further comprising a third lens having a positive power, receiving said convergent beams and providing mutually divergent output beams as a unity conjugate lens, and the fourth lens being disposed for receiving said mutually divergent beams and collimating said beams wherein said second bulk lens is a fifth lens being disposed for focussing said beams onto said receiver array.

This third embodiment allows path also has the advantage of allowing path length reduction by comparison with the above-discussed first embodiment, but to a lesser degree than the second embodiment. However the use of the relay lens may enable easier control of optical aberrations.

In an advantageous modification, the optical system has an optical axis and the input and receiver arrays are mutually offset to opposite sides of the system optical axis, other components remaining on-axis.

This configuration can allow undeflected signals, termed herein zero-order signals, to pass through without causing cross talk.

In a preferred modification of the above second and third embodiments, the optical system has an optical axis and the input and receiver arrays, the first, second, fourth and fifth lenses are disposed on the system optical axis and the third lens is laterally offset there from.

This also allows undeflected signals to pass straight through without causing cross talk, and enables a relatively improved optical aberration performance.

In a second class of embodiments, the spatial light modulators are reflective.

In a first embodiment of the second class, the optical system has a zigzag axis, and each of said pair of lenses is disposed with respect to an associated spatial light modulator such that light travelling along said axis passes twice through each of said lenses.

In a preferred embodiment of the second class, each of said first and second bulk lenses has an associated further lens disposed to form an optical magnification stage.

In a first modification, a relay lens is disposed in the interconnect region.

IN a second modification, a field lens is disposed in the interconnect region.

To provide immunity from cross talk, the relay or respectively field lens may be disposed off-axis.

In a preferred embodiment of the first aspect of the invention, said input optical fibre array and said receiver array have respective input and output ports each comprising a respective 32×32 array of ports, and said ports are disposed at normalised coordinate locations defined by:

| Input Port Locations $(\eta_i, \xi_i)$ | Output Port Locations $(\eta_o, \xi_o)$ |
| --- | --- |
| $(-1/60, -1/12)$ | $(+1/60, -1/12)$ |
| $(-1/30, -1/12)$ | $(+1/30, -1/12)$ |
| $(-1/20, -1/12)$ | $(+1/20, -1/12)$ |
| $(-1/60, -1/15)$ | $(+1/60, -1/15)$ |
| $(-1/30, -1/15)$ | $(+1/30, -1/15)$ |
| $(-1/20, -1/15)$ | $(+1/20, -1/15)$ |
| $(-1/60, -1/20)$ | $(+1/60, -1/20)$ |
| $(-1/30, -1/20)$ | $(+1/30, -1/20)$ |
| $(-1/20, -1/20)$ | $(+1/20, -1/20)$ |
| $(-1/60, -1/30)$ | $(+1/60, -1/30)$ |
| $(-1/30, -1/30)$ | $(+1/30, -1/30)$ |
| $(-1/20, -1/30)$ | $(+1/20, -1/30)$ |
| $(-1/60, -1/60)$ | $(+1/60, -1/60)$ |
| $(-1/30, -1/60)$ | $(+1/30, -1/60)$ |
| $(-1/20, -1/60)$ | $(+1/20, -1/60)$ |
| $(-1/60, 0)$ | $(+1/60, 0)$ |
| $(-1/30, 0)$ | $(+1/30, 0)$ |
| $(-1/20, 0)$ | $(+1/20, 0)$ |
| $(-1/60, +1/60)$ | $(+1/60, +1/60)$ |
| $(-1/30, +1/60)$ | $(+1/30, +1/60)$ |
| $(-1/20, +1/60)$ | $(+1/20, +1/60)$ |
| $(-1/60, +1/30)$ | $(+1/60, +1/30)$ |
| $(-1/30, +1/30)$ | $(+1/30, +1/30)$ |
| $(-1/20, +1/30)$ | $(+1/20, +1/30)$ |
| $(-1/60, +1/20)$ | $(+1/60, +1/20)$ |
| $(-1/30, +1/20)$ | $(+1/30, +1/20)$ |
| $(-1/20, +1/20)$ | $(+1/20, +1/20)$ |
| $(-1/60, +1/15)$ | $(+1/60, +1/15)$ |
| $(-1/30, +1/15)$ | $(+1/30, +1/15)$ |
| $(-1/20, +1/15)$ | $(+1/20, +1/15)$ |
| $(-1/60, +1/12)$ | $(+1/60, +1/12)$ |
| $(-1/30, +1/12)$ | $(+1/30, +1/12)$ |

In a second aspect of the invention, there is provided an optical switch comprising an input optical fibre array and a receiver array, and an optical system connecting the input optical fibre array to the receiver array wherein the optical system comprises a first binary reconfigurable spatial light modulator, a second binary reconfigurable spatial light modulator, each spatial light modulator being adapted for providing a respective selectable set of holograms each for a desired switching operation, and a pair of lenses between said first and second binary reconfigurable spatial light modulators for defining therebetween an interconnect region, wherein each spatial light modulator comprises a display screen, memory circuitry for a plurality of sets of hologram data and selection circuitry for selecting one of said sets according to a desired switching function, each stored set of hologram data being calculated by:

determining principal replay coordinates of a said hologram according to a desired switching function; using said coordinates:

calculate the size in pixels of a base cell; and evaluating a base cell pattern by a phase quantisation procedure; and replicating said base cell pattern data until the entire aperture of the spatial light modulator is filled.

In a third aspect of the invention there is provided an optical switch comprising an input optical fibre array and a receiver array, and an optical system connecting the input optical fibre array to the receiver array wherein the optical system comprises a first ferroelectric liquid crystal spatial light modulator, a second ferroelectric liquid crystal spatial light modulator, each spatial light modulator being adapted for providing a respective selectable set of holograms each for a desired switching operation, and a pair of lenses between said first and second ferroelectric liquid crystal spatial light modulators for defining therebetween an interconnect region, wherein each spatial light modulator comprises a display screen, memory circuitry for a plurality of sets of hologram data and selection circuitry for selecting one of said sets according to a desired switching function, each stored set of hologram data being calculated by:

determining principal replay coordinates of a said hologram according to a desired switching function; using said coordinates:

calculate the size in pixels of a base cell; and evaluating a base cell pattern by a phase quantisation procedure; and replicating said base cell pattern data until the entire aperture of the spatial light modulator is filled.

Advantageously said step of determining principal replay coordinates of a desired hologram comprises determining the normalised angular deviation upon a collimated paraxial beam required of a desired hologram; deriving from said deviation the principal replay mode coordinates for said desired hologram.

Preferably said step of calculating comprises converting said coordinates to rational numbers each comprising a numerator and a denominator, wherein said rational numbers are simplified so that said denominators have their lowest integer values, and using said denominators as the number of pixels for said base cell pattern.

According to a fourth aspect of the invention there is provided a method of producing a phase-only computer generated hologram for a pixellated hologram device, having a respective (x,y) plane and a predetermined number of uniformly distributed phase levels, the method comprising:
determining principal replay coordinates of a desired hologram;
using said coordinates:
calculating the size in pixels of a base cell; and
evaluating a base cell pattern by a phase quantisation procedure; and
replicating said base cell in the plane of the said hologram device until the entire aperture of the device is filled.

Advantageously said step of determining principal replay coordinates of a desired hologram comprises determining the normalised angular deviation upon a collimated paraxial beam required of a desired hologram; deriving from said deviation the principal replay mode coordinates for said desired hologram;

Preferably said step of evaluating comprises: converting said coordinates to rational numbers each comprising a numerator and a denominator, wherein said rational numbers are simplified so that said denominators have their lowest integer values, and using said denominators as the number of pixels for said base cell pattern.

Advantageously the method further comprises constraining said numerator and denominator by a predetermined mathematical relationship.

Conveniently said mathematical relationship is specified by $$-\tfrac{1}{2}D_z \leq N_z \leq \tfrac{1}{2}D_z \quad -\tfrac{1}{2}D_z \leq N_y \leq \tfrac{1}{2}D_y \quad 1 \leq D_z \leq R_z$$
$$1 \leq D_y \leq R_y$$

where $N_x$, $N_y$ are said numerators and $D_x$, $D_y$ are said denominators.

Preferably said evaluating step comprises defining a spatially sampled phase screen using said rational fractions such that $$\phi(k, l) = k\frac{N_x}{D_x} + l\frac{N_y}{D_y}$$

wherein $\phi$ is the phase screen, $k=0,1,2 \ldots (D_x-1)$ and $l=0,1,2 \ldots (D_y-1)$ Preferably again said evaluating step further comprises: phase-quantising said phase screen to said predetermined number of uniformly distributed phase levels using $$\phi_s(k,l)=\exp(2\pi j \times int\{\Phi(k,l)\times\Psi\}/\Psi)$$

where $\phi_s(k,l)$ is the final sampled and quantised representation of the base-cell pattern for the target hologram device,
j is the complex operator $(-1)^{1/2}$, exp ( . . . ) is the exponential operator, and int{ . . . } is a quantisation function that rounds its argument to the nearest integer towards minus infinity.

Embodiments of the present invention concern switches based on ferroelectric liquid crystal (FLC) Spatial Light Modulators (SLMs) using in-plane switching to give binary phase modulation. It has been found that contrary to an earlier published paper (K L Tan, W A Crossland & R J Mears, "A comparison of the efficiency and cross-talk of quad and binary phase only holograms based on ferroelectric liquid crystals", Ferroelectrics 213, 233–240, (1998)) it is NOT possible to achieve multilevel phase modulation with this type of device so the insertion loss cannot be fully minimised, neither can the crosstalk except with considerable difficulty.

BRIEF DESCRIPTION OF THE DRAWINGS

Exemplary embodiments of the invention will now be described with reference to the accompanying drawings in which:

FIG. 1 shows a schematic diagram of an optical system useable in an optical switch according to the invention;

FIG. 2 shows a schematic diagram of first embodiment of an optical switch in accordance with the invention, based upon the configuration of FIG. 1;

FIG. 5 shows a first modification of the switch of FIG. 2, including an additional negative power lens;

FIG. 6 shows a second modification of the switch of FIG. 2, including an additional positive power lens;

DESCRIPTION OF THE PREFERRED EMBODIMENTS

Figure 3:
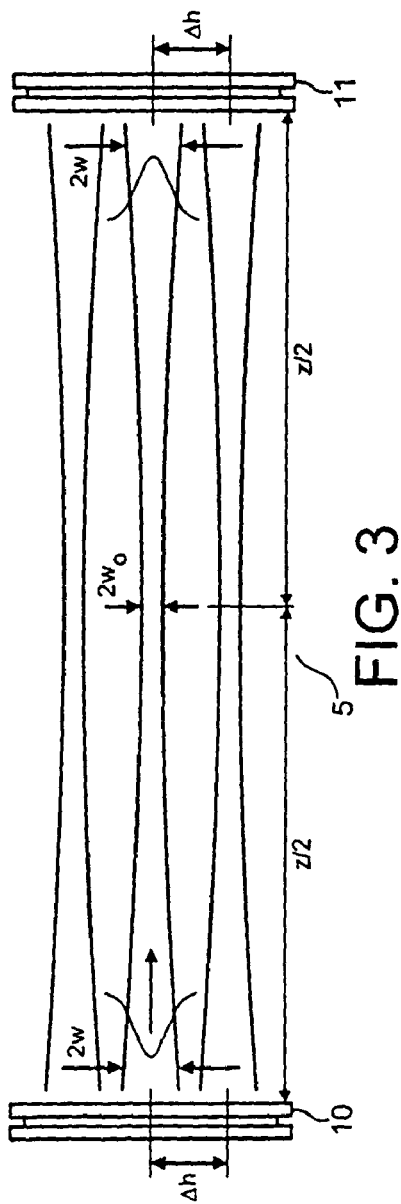
FIG. 3 shows an enlarged view of the interconnect region of FIG. 2, and illustrates the Gaussian waist of the beams as they traverse the interconnect region.

In the various figures, like reference numerals refer to like parts.

Figure 15:
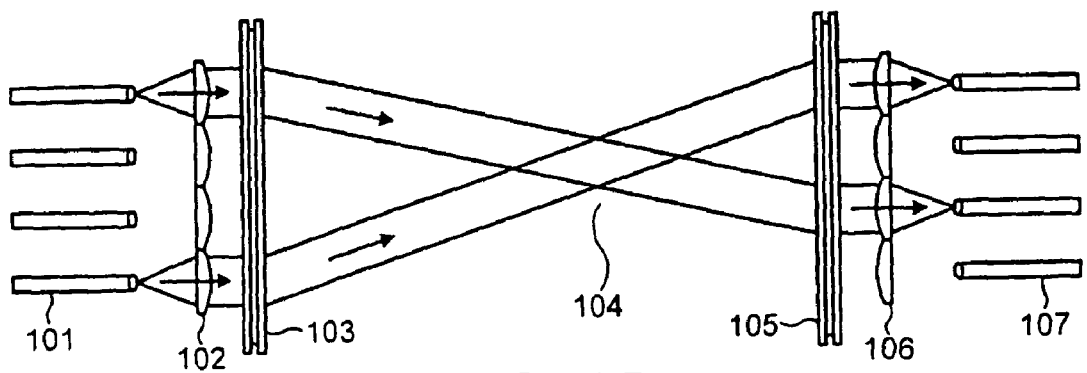
FIG. 15 shows a prior art switch useful in understanding the present invention.

Starting by referring to FIG. 15, an array of optical sources (101) and an array of optical receivers (107) are arranged as the input elements and output elements of a holographic switch. For many applications, the sources and receivers may comprise cleaved or end-polished fibres. In other applications, the inputs may be light emitting sources such as lasers or LEDs, and the outputs may be photodetectors. Each input (101) may transmit a different digital or analogue optical signal through the switch to one (or possibly several) of the outputs (107). Thus up to N different signals may be simultaneously passing through the switch at any instant. The light applied at each input may consist of a single-wavelength modulated by data; a number of different data sources operating at different wavelengths (e.g. a wavelength-multiplexed system); or a continuum of wavelengths. Although the switch is shown in cross-section in FIG. 15, the input & output arrays (101,107) are typically 2-dimensional arrays, and the holographic switch comprises a 3-dimensional volume.

To achieve switching, the input array (101) is arranged behind a lens array (102). Each optical signal emitted by the input array enters free-space, where it is collimated by one of the lenses in lens array (102). Each collimated beam then passes through a hologram device (103). The hologram device (103) displays a holographic pattern of phase and/or intensity and/or birefringence that has been designed to produce a specific deflection of the optical propagation directions of the beams incident upon the device. The hologram pattern may also be designed such that each optical beam experiences a different angle of deflection. The device (103) may also have the effect of splitting an individual beam into several different angles or diffraction orders. One application for utilising this power splitting effect is to route an input port to more than one output port. The deflected optical signals propagate in free-space across an interconnect region (104) until they reach a second hologram device (105). The hologram pattern at the second hologram device (105) is designed in such a way to reverse the deflections introduced at the first hologram device (103) so that the emerging signal beams are parallel with the system optic axis again.

The optical signals then pass through a second lens array (106) where each lens focuses its associated optical signal into the output ports of the receiver array (107). Thus the hologram pattern displayed on the first hologram device (103) and the associated hologram pattern displayed on the second hologram device (105) determine which output fibre or fibres of the receiver array (107) receive optical data from which input fibre or fibres of the input array (101). The interconnect region (104) allows the signal beams to spatially reorder in a manner determined by the specific hologram patterns displayed on the first and second hologram devices (103, 105). The switch also operates reversibly such that outputs (107) may transmit optical signals back to the inputs (101).

In seeking to replace the fixed hologram devices of FIG. 15 with reconfigurable devices, a number of problems arise, including the following:

1) In order to implement such a holographic switch an appropriate set of hologram patterns must be chosen. This hologram set must be capable of routing any input channel to any output channel whilst keeping the insertion loss and crosstalk figures within specified values. This is not a straightforward task as th noise isolation between channels depends heavily on the patterns being used. In particular, the hologram set must be optimised to prevent higher order diffraction beams being launched down the wrong channel.

2) The maximum angular deflection that can be generated by a reconfigurable hologram is typically less than can be achieved by a fixed hologram recording. The length of interconnect region (104) between the planes of the first and second hologram devices (103, 105) is determined by this maximum angular deflection, and therefore a switch typically requires a greater free-space optical path-length than an optical shuffle. Because of component tolerances and packaging design constraints, it is often highly desirable to minimise this optical path-length.

3) The diffraction efficiency of a reconfigurable hologram is typically less than 100%, with some proportion of the shortfall exhibited as an undeflected "zero-order" signal passing straight through the first and second hologram devices (103, 105). Without further enhancement to the switch, these undeflected signals give rise to unwanted noise signals in the receivers, e.g. a fraction of the signal from input 1 always reaches output 1 irrespective of the hologram states, a fraction of the signal from input 2 always reaches output 2, etc. These signals corrupt the proper functioning of the switch.

4) A convenient method of constructing reconfigurable holograms for use within an N×N switch is to integrate a layer of liquid crystal material above a silicon circuit. This type of SLM typically operates in reflection rather than transmission, and the switch layout shown in FIG. 15 is therefore no longer appropriate.

FIG. 2 shows the basic configuration of an N×N holographic switch for use with transmissive spatial light modulators. However, for improved understanding, description will first be made of FIG. 1 which is identical to FIG. 2 save for having no hologram devices. An array (1) of optical sources is disposed on the left as shown, and an array (9) of optical receivers is disposed to the right, as shown.

In the optical path between the input array (1) and the receiver array (9) there are disposed, in order, a first collimating lens (2), a first focusing lens (4) a second collimating lens (6) and a second focussing lens (8). Each of these lenses is a bulk lens, thus avoiding the use of microlenses, with their attendant problems of accuracy, reproducibility and cost. The first collimating lens is spaced from the input array (1) and the second focusing lens is spaced from the output array. The first collimating lens (2) and the first focusing lens (4) define therebetween a fan out region, the first focusing lens and second collimating lens define therebetween an interconnect region and the second collimating lens and the second focusing lens define therebetween a fan in region.

Following input (1), the array of optical signals enter free-space where they are collimated by the first collimating lens (2) which has a focal length of $f_2$.

Input array (1) is typically arranged in the back focal plane of lens (2) at a distance $f_2$ from the principal surface of the lens such that the signal beams are collimated in different angular directions. Following lens (2), the collimated signals propagate in the free-space fan-out region (3) towards first focussing lens (4), which has a focal length of $f_4$. The signals propagating in region (3) are angularly dispersed by lens (2) so that the collimated beams are completely spatially separated by the time they reach first focusing lens (4). The location of lens (4) relative to lens (2) is chosen such that the beams pass across the interconnect region (5) parallel to one another. Typically this condition is met by locating the principal surface of lens (4) a distance $f_2+f_4$ away from the principal surface of lens (2). An array of focused spots is then typically formed in the front focal plane of lens (4), somewhere within the interconnect region (5).

Following the interconnect region (5), second collimating lens (6) re-collimates the signals and feeds them into the fan-in region (7) where they are focused by second focusing lens (8) into the appropriate output fibres (9). Second focusing lens (8) is typically located a distance $f_6+f_8$ in front of second collimating lens (6), and the output elements (9) are located in the focal plane of lens (8). In practice each of the first and second collimating and first and second focus ing lenses (2,4,6,8) may consist of a single bulk element or equivalent component with optical power such as cemented achromats, compound lens systems, and/or mirror elements. In addition, when the input sources (1) and output receivers (9) have the same optical numerical aperture of emission and light acceptance respectively (e.g. the inputs and outputs are single-mode fibres) then first collimating lens (2) will have be similar to second focusing lens (8), and first focusing lens (4) will be similar to second collimating lens (6). In this case, a focal plane will exist exactly midway between first focusing lens (4) and second collimating lens (6).

In the case of fibre-to-fibre switching: input and output arrays (1,9) may contain fibres that have been cleaved or end-polished at an angle to reduce back reflections; may be anti-reflection coated; or may consist of a wave guiding device to adapt the optical signals to the correct positions and spacings. Alternatively, some construction for producing 2-dimensional fibre arrays may be used.

Referring to FIG. 2, the switch is shown with first (10) and second (11) binary hologram devices, in the form of ferroelectric liquid crystal (FLC) spatial light modulators (SLMs) disposed respectively on the outside of first focusing lens (4) and on the outside of second collimating lens (6) about interconnect region (5). It will be understood by those skilled in the art that the hologram devices may alternatively be placed on the inside of the lenses to define therebetween the interconnect region. However, the arrangement shown is advantageous in that an odd number of bulk lenses—here 1—between the fibres and the spatial light modulators causes offset variations due to wavelength variations to be convertible to a tilt error at the output. As known to those skilled in the art, tilt errors are less problematic for optical fibres than offset errors. The hologram devices used in this embodiment are ferroelectric liquid crystal spatial light modulators which are selected because of ease of use as binary light modulators although other binary light modulator devices may be used instead. The spatial light modulators are located as close as possible to outermost surfaces of the first focusing and second collimator lenses (4,6).

The spatial light modulators (10,11) are driven to display various patterns of phase and/or intensity and/or birefringence which are designed to deflect the optical propagation directions of the beams incident upon the devices. At any instant, the hologram pattern displayed at (11) must be designed to restore the deflections introduced at device (10). Thus the deflections introduced by the holograms cause the input signals to be re-ordered and routed to the outputs in a manner according to the hologram patterns displayed. As the hologram patterns are changed, so is the routing of the switch. In this embodiment of the invention, optical switching is achieved without the need for lens array components. By using ferroelectric liquid crystal SLMs, polarisation independence may be achieved. As will be discussed later herein, this is an important feature where the incoming polarisation cannot necessarily be determined.

Design equations for constructing an N×N switch are now discussed for the situation where the optical signal beams have Gaussian TEM$_{00}$ profiles. A Gaussian beam is a useful approximation to the optical profile emitted by lasers and cleaved single-mode fibres. As a paraxial Gaussian propagates in free-space between lenses, its radial dimension changes but its profile remains Gaussian according to the following well-known propagation rule:

$$w = w_o \sqrt{1 + \left(\frac{\lambda z}{2\pi w_o^2}\right)^2} \quad (1)$$

where $w_o$ is the Gaussian waist dimension (minimum beam radius) arbitrarily located at z=0, w is the transverse beam radius at location z/2, z/2 is the propagation distance from the waist, $\lambda$ is the central optical wavelength of the optical signal beams.

For applications where the optical switch system described with respect to FIGS. 1 and 2 is designed symmetrically, then each signal beam will form a Gaussian waist of diameter 2w exactly midway between hologram devices (10,11) at the centre of interconnect region (5), as shown in FIG. 3. For an interconnect distance z between holograms, the beams at planes (10,11) will have Gaussian diameters of 2w given by equation (1) above. In addition, if the distances between lens (4) and hologram (10), and between lens (6) and hologram (11) are negligible, then $f_4$ and $f_6$ should both be chosen to be equal to z/2.

Figure 4:
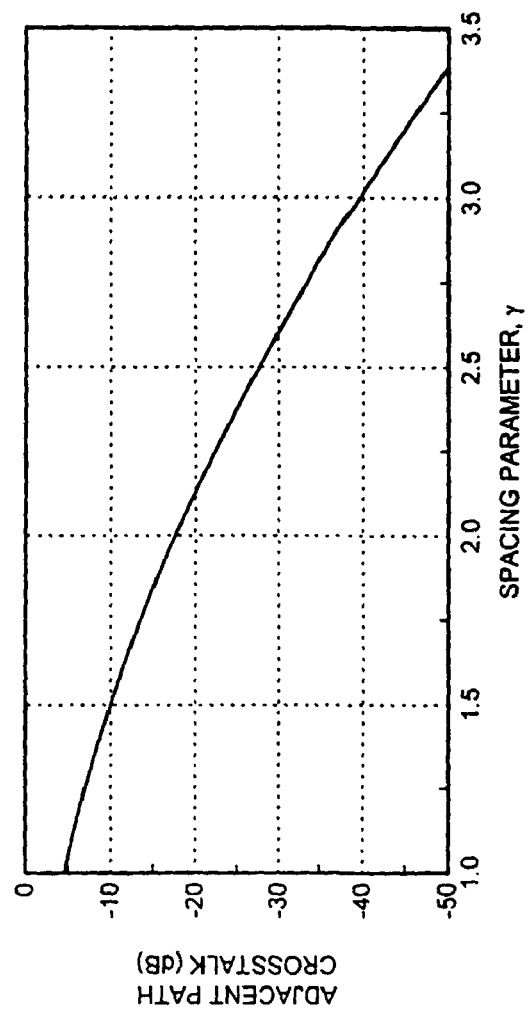
FIG. 4 is a plot of the expected noise isolation between any 2 adjacent optical paths given aberration-free optics.

Typically it is desirable make the inter-spacing, $\Delta$h, of the optical signals at planes (10,11) as small as possible to shorten the interconnect length. However, it is also desirable to increase this same dimension to reduce cross talk between adjacent signals. FIG. 4 is a plot of the expected noise isolation between any 2 adjacent optical paths given aberration-free optics. Parameter $\gamma$ is defined by equation 2, as:

A system design limit of $\gamma \geq 3$ is often acceptable, giving rise to about 39 dB of noise isolation between adjacent signal paths or better. It has been found that there is an optimum (minimum) value for $\Delta$h for a given value of $\Delta$h found by equating the first derivative of equation (1) to zero (equation 3):

$$\Delta h = \gamma \sqrt{\frac{\lambda z}{\pi}} \quad (3)$$

In addition, if the hologram devices are pixellated then there exists a maximum useful angle of diffraction, $\Phi$, that can be introduced by these devices. This angle expressed in equation 4, ultimately determines the minimum interconnect length, z, that sustains correct operation of the switch:

$$\phi \approx \frac{\lambda}{2d} z \approx \frac{A}{\phi} \quad (4)$$

where d is the hologram pixellation pitch,

A is the total used hologram aperture.

In the general case, spatial light modulators (10,11) may introduce angular diffraction about just one, or both, axes of rotation and the hologram pixellation pitch may differ between the x and y axial directions.

Equations (2) through (4) lead to a design criteria in terms of the required interconnect length versus the number of inputs & outputs that can be supported. For the case where there are N inputs and N outputs arranged on regular 2-dimensional square-grids, the paraxial solution is given in equation 5:

$$z \approx \Delta h\left(\frac{2d\sqrt{N}}{\lambda}\right) \approx 4Nd^2\left(\frac{\gamma^2}{\pi\lambda}\right) \quad (5)$$

Thus a 32×32 switch constructed using holograms with 20 μm feature size, operating at a central wavelength of 1.55 μm, and with γ=3, requires the spatial light modulators (10,11) to be spaced apart by at least 95 mm. The insertion loss of the switch then increases gradually as the injected wavelength deviates from the design wavelength.

Equation (5) is the minimum optical path-length design for a holographic optical switch. A full design cycle for the switch must however also incorporate a procedure for determining an appropriate set of hologram patterns. This hologram set must typically be at least capable of routing any input to any output according to the capabilities of the hologram devices used, whilst also maintaining various switch performance targets such as the noise isolation between all optical paths and the insertion loss variability as the switch is reconfigured. Under these constraints, the hologram set may not utilise the full range of deflection angles that are available from the hologram devices. In addition, spatial arrangements of the input and output ports other than 1:1 aspect ratio square-packed grids may be better optimised for some applications. Hence it may not be possible to achieve the minimum optical path-length design. For these embodiments, equation (5) should be modified to equation 6:

$$z \approx C\left(\frac{d\Delta h}{\lambda}\right) \approx C^2\left(\frac{\gamma^2 d^2}{\pi\lambda}\right) \quad (6)$$

where C represents a scale parameter to account for the properties of the chosen hologram set. C must typically be determined by iterative design of the relative input and output port locations.

Each input port of the switch illuminates a unique sub-aperture region of device (10) and each output port collects light from a unique sub-aperture region of device (11). Each sub-aperture must then contain a minimum number of hologram pixels in order to achieve the correct switching functionality.

Equation (7) represents the minimum number of hologram pixels that must be present per sub-aperture per axis of diffraction.

$$\text{minimum number of hologram pixels per port per axis of diffraction} = \frac{\Delta h}{d} = \frac{C\gamma^2}{\pi} \quad (7)$$

A sample of known data points for high-performance switch designs (≈40 dB noise isolation, <1 dB loss variability) based on square-packed input/output arrays and utilising binary-phase hologram devices such as ferroelectric-liquid-crystal spatial-light-modulators (FLC-SLMs), is tabulated below (Table 1):

TABLE 1

Requirements for switch layout.

| Switch Functional Size | Spatial Arrangement of Input & Output Ports | C | Minimum Number of Pixels per Hologram Device |
|---|---|---|---|
| 3 × 3 | 3 × 1 | 24 | 207 × 1 |
| 9 × 9 | 3 × 3 | 24 | 207 × 207 |
| 32 × 32 | 3 × 11 | 60 | 516 × 1891 |

The maximum angular deflection that can be generated by a reconfigurable hologram is typically less than can be achieved by a fixed hologram recording and a switch typically therefore requires a relatively long free-space optical path-length between hologram devices.

Referring now to FIGS. 5 and 6, the physical distance between hologram devices (10,11) is reduced by introducing additional optical elements to the switch. In these two embodiments, the length of interconnect region (5) and thereby the optical path-length of the switch are reduced by incorporating a fifth lens into the system.

Referring to FIG. 6, a further lens element (12) with negative optical power is placed as a field lens in the centre of interconnect region (5), and lenses (4, 6) of the embodiment of FIGS. 1–5 are replaced by lenses (13,14) respectively with shorter focal lengths. Each of these lenses is a bulk lens and may consist in practice of a single bulk element or equivalent compound component with optical power such that (equation 8):

$$(f_{13}+f_{14}) < (f_4+f_6) \quad (8)$$

Where
$f_{13}$ is the focal length of lens (13),
$f_{14}$ is the focal length of lens (14).

The addition of field lens (12) compensates for the shorter focal lengths of (13,14). For the common case when $f_{13}$ equals $f_{14}$, operation of the switch will be maintained when element field lens satisfies equation 9:

$$f_{12} = \frac{f_{13}^2}{2f_4 - 2f_{13}} \quad (9)$$

where $f_{12}$ is the focal length of lens (12), $f_4$ is the focal length of the lens being replaced.

Another embodiment is shown in FIG. 6, where a further lens element (15) with positive optical power is placed as a unity-conjugate relay lens in the centre of interconnect region (5), and lenses (4, 6) of the embodiment of FIGS. 1–5 are replaced by lenses (16,17) respectively with shorter focal lengths. Each of these lenses is a bulk lens and may consist in practice of a single bulk element or equivalent compound component with optical power such that (equation 10):

$$(4f_{15}+f_{16}+f_{17}) < (f_4+f_6) \quad (10)$$

where $f_{15}$ is the focal length of relay lens (15), $f_{16}$ is the focal length of lens (16), and $f_{17}$ is the focal length of lens (17).

In the embodiment of FIG. 6, the spatial ordering of the output ports is mirror-reversed about both the x and y axes in order to remain functionally identical to the original switch design. The addition of relay lens (15) compensates for the reduction in focal length of (16, 17). For the common case when $f_{16}$ equals $f_{17}$, operation of the switch will be maintained when relay lens (15) satisfies equation 11:

$$f_{15} = \frac{f_{16}^2}{2f_4 - 2f_{16}} \tag{11}$$

Using a 32×32 switch as example, the optical path-length between hologram devices (10, 11) for the three embodiments is as follows.

For the first embodiment, discussed with respect to FIGS. 1–4, it has already been established that a minimal length for the interconnect region is 95 mm.

For the second embodiment discussed with reference to FIG. 5, if $f_{13}=f_{14}=18$ mm then the central concave element has a focal length of 5.5 mm, and the interconnect length is 36 mm.

For the third embodiment discussed with reference to FIG. 6, if $f_{16}=f_{17}=18$ mm then the central convex element has a focal length of 5.5 mm, and the interconnect length is 58 mm.

Clearly the third embodiment is longer, but it has the advantage of ease of control of optical aberrations.

Figure 7:
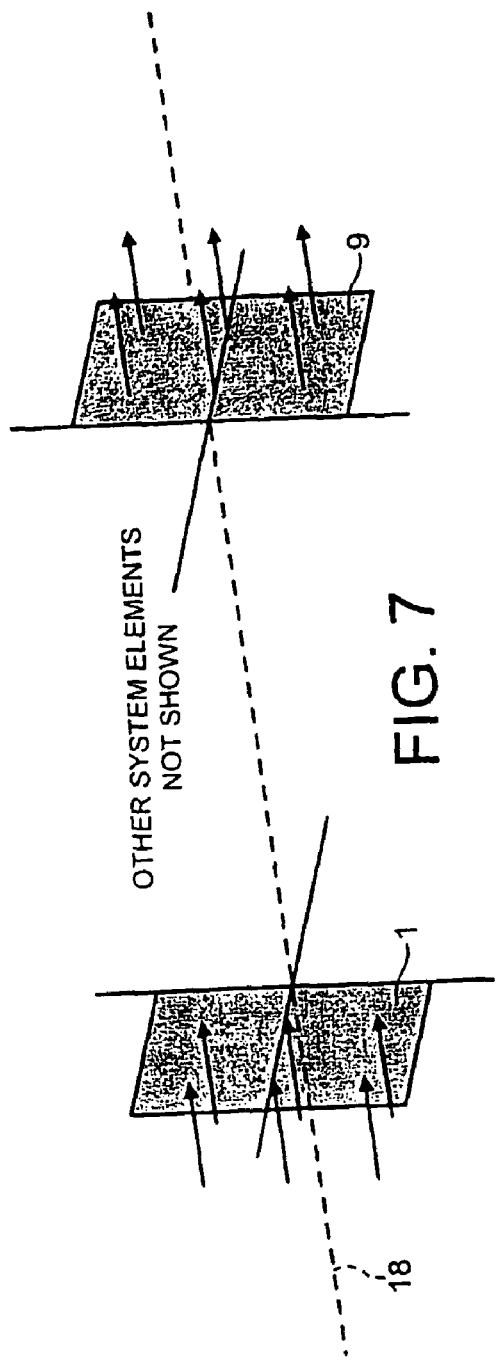
FIG. 7 shows a schematic diagram of a layout of an optical switch modified to reduce cross-talk.

The diffraction efficiency of a reconfigurable hologram is typically less than 100% due to imperfect optical modulation and/or due to spatial dead-space within the hologram pattern. Some proportion of the efficiency shortfall is often exhibited as an undeflected "zero-order" beam where a zero-order beam is one that passes straight through both hologram devices (10,11). Without further enhancement to the switch, these zero-order signals can generate cross talk in the output ports and thereby corrupt proper switch function.

Where this is a problem the embodiments may be modified so that the zero-order signals pass safely out of the optical aperture of the system. Referring to FIG. 7, in a first switch, the input and output arrays (21,29) are offset to opposite sides of a system optic axis (18) whilst all other components remain symmetrically on-axis. Thus the optic axis (18) of the system passes through the centre of all lens elements in the switch, but the input array (21) is offset completely to one side of this axis, and the output array (29) is completely offset to the opposite side. In addition, it is apparent that the optimum aspect ratio for the input and output arrays, given the same maximum diffraction angle capability of the hologram devices, is now 1:2 rather than a square array because of the system asymmetry. This change in aspect ratio will typically be reflected in slightly higher design values of parameter C (see equation 6 above).

The switch of FIG. 7, due to the need to operate in an off-axis manner, may lead to the introduction of performance-limiting optical aberrations.

Figure 8:
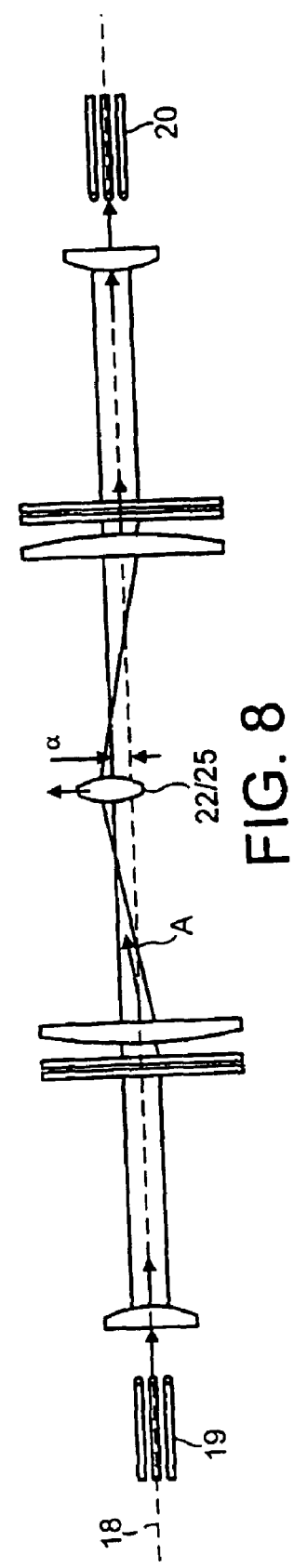
FIG. 8 shows a more detailed view of an optical switch with an off-axis additional lens for reducing cross-talk.

A configuration which is functionally identical but which allows the optical system to operate in a near-paraxial manner is to adopt the configuration shown in FIG. 8. In the switch of FIG. 8, the input and output arrays and all lens components remain symmetrically on-axis except a central field or relay lens element (22) or (25) which is laterally offset by a small amount.

Referring to FIG. 8, if a point (19) located on the optic axis in the plane of the input array (1) emits an optical signal then it may be interconnected to a point (20) located on the optic axis in the plane of the output array by deflecting an optical beam through an angle +A at device (10) and through an angle −A at device (11). Angle A is a parameter determined by the switch designer in order to avoid zero-order cross talk problems. Points (19) and (20) are typically located in the geometric centres of the input and output array regions respectively. The required lateral offset, α of the central lens element, as shown in FIG. 8, is then, (equation 12):

$$\alpha = (2f_{12} + f_{13}) \times A \tag{12}$$

if the central element is a negative lens as per FIG. 5, or if the central element is a positive lens as per FIG. 6 (equation 13):

$$\alpha = f_{16} \times A \tag{13}$$

In both cases A is measured in radians about the axis orthogonal to the direction of displacement of the central lens.

Figure 9:
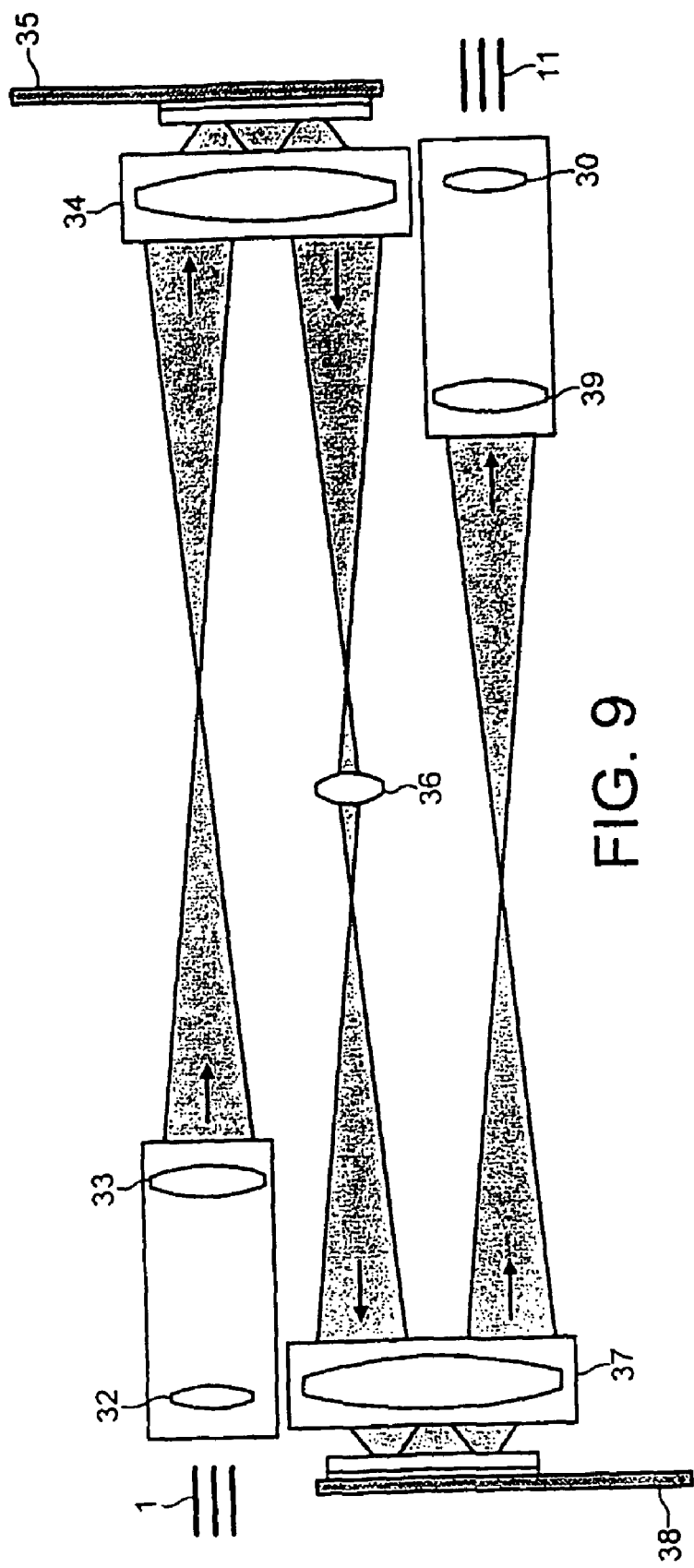
FIG. 9 shows a diagram of an optical switch using reflective hologram devices.

Devices such as multiple-quantum-well modulator arrays, acousto-optic and electro-optic cells and liquid-crystal modulators are all potentially suitable devices for displaying reconfigurable holograms. Hologram devices (10,11) may in actuality be a single hologram pixel array, two individual hologram pixel arrays, or a multiplicity of pixel arrays. As discussed above ferroelectric liquid-crystal (FLC) pixel arrays are particularly well suited to holographic switches because they may be configured as phase holograms in a polarisation insensitive way. Polarisation insensitivity is particularly important for fibre-to-fibre switches where it is relatively difficult to control the polarisation states entering the switch. A thin layer of an FLC material may also be conveniently integrated above a semi-conducting device as a spatial light modulator (SLM). In this case, circuitry on the silicon chip acts as both addressable electrodes for modulating the liquid-crystal, and as mirrors for reflecting the incident light. Holographic switches constructed with FLC-SLMs (Ferroelectric Liquid Crystal Spatial Light Modulators) can be reconfigured relatively quickly. Referring to FIG. 9, an embodiment of a holographic optical switch using reflective hologram devices will be described. Such reflective devices may for example be FLC-on-semiconductor SLMs. Note that beam-splitters are often used in optical systems to accommodate components such as reflective SLMs. However unless such beam-splitting components have careful polarisation control of the optical signal passing through them, they introduce 3 dB optical loss per pass. Such constraints are unacceptable in many optical switching applications.

The embodiment discussed with reference to FIG. 9 therefore demonstrates a system without the use of beam-splitters.

In FIG. 9, the input array (1) and output array (9) are arranged at the ends of the switch optics. The input signal beams are collimated by a first lens (32), and focused back into the output ports by a second lens (30). Two reflective hologram devices (35, 38) are arranged about an interconnect region comprising two lenses (34,37), and an additional relay or field lens (36) is added as required. Due to the reflective nature of the hologram devices however, the optical signal beams must now pass twice through lenses (34, 37) in opposite directions. The inward and outward passes through these lenses must also be spatially or angularly separated, to provide a zigzag path. The optical system therefore takes the form of a squashed or upright 'Z' respectively. In addition, lenses (33) and (39) have been added to the switch in order to compensate for these double passes. The combination of lenses (32) and (33) form an optical magnification stage (e.g. an objective lens) which projects an image of the input array in front of lens (34). Lens (34) then collimates the beams onto the first SLM (35) and feeds the signals into the interconnect region. Likewise, lens (37) collimates the beams onto the second SLM (38) and feeds the signals to the demagnification stage formed by the combination of lenses (39) and (30).

Figure 10:
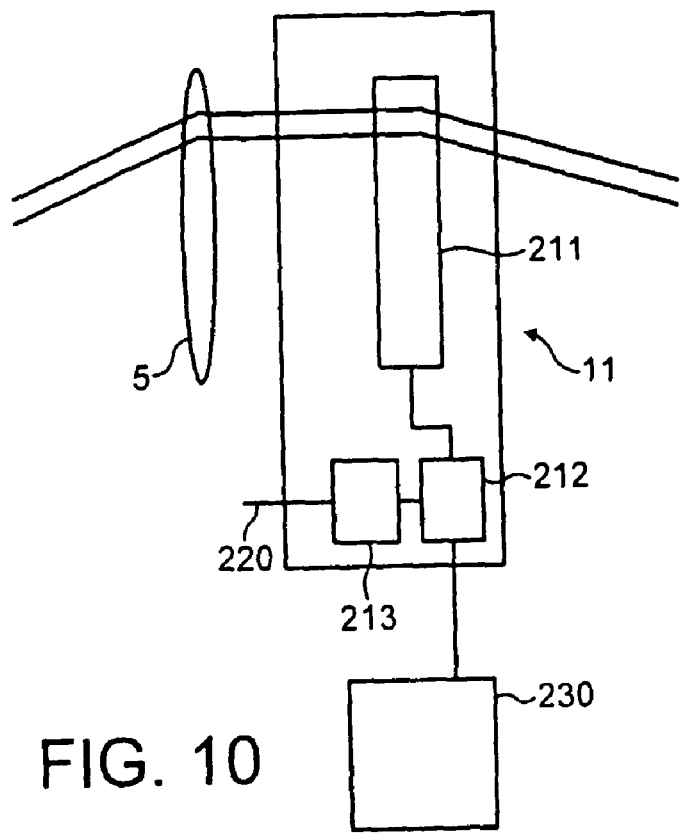
FIG. 10 shows a partial block schematic diagram of an embodiment of an optical switch according to the invention, showing connections for generation, storage, and selection of holograms.

FIG. 10 shows a partial block schematic diagram of the switch of FIG. 2. Referring to FIG. 10, the spatial light modulator (11) has an lcd screen area (211) which has associated control and drive circuitry (not shown) for powering the device. Memory circuitry (212) stores hologram data and selector circuitry (213) responds to a control input (220) to effect switching as desired, by selecting a hologram pattern from the memory for display on the screen area (211). A computer (230) calculates a set of hologram data for storage in the memory circuitry, as will later be described herein. The computer may be disconnected from the memory circuitry in use, once the hologram data has been derived.

In normal use, the second collimating lens (6) provides output beams (206—only one shown for clarity) which are parallel and applied to the liquid crystal screen area. Upon the screen area a display is provided in accordance with a hologram pattern selected by the control input (220) and the incident beam is diverted by means of the hologram to the required output element in the output array (9, not shown).

An ideal computer-generated hologram (CGH) is a spatial pattern of continuous phase and/or intensity modulation generated by some fixed or reconfigurable display device. In practice, processing limitations in producing CGH patterns, and device limitations in displaying reconfigurable CGH patterns, mean that practical CGHs are typically spatially sampled (e.g. pixellated) and then quantised to a discrete number of modulation levels. The most common types of CGH provide phase-only modulation, and are often limited to binary phase capability (e.g. $0,\pi$). Because of the non-linear nature of the phase quantisation process, direct calculation of the optimum CGH pattern required to generate a particular pattern of replay is usually impossible, and therefore heuristic iteration techniques such as simulated annealing or error diffusion have often been employed for hologram design.

Iterative CGH design procedures provide a good balance between optimising the replay field generated by a CGH against some target field, whilst broadly minimising the unwanted noise in the replay. However, the inherent randomness that is typically programmed into these algorithms also means that each calculation cycle may create a CGH with unique noise characteristics, i.e. the user must intervene at some stage to select the most appropriate hologram for his or her application. This 'hit and miss' approach is not well suited to the use of CGHs for optical switches, where the background noise in the replay field must typically be well quantified in order to prevent cross talk build up within the system. There will now be described a design procedure for CGH patterns sets that is suitable for holographic optical switches.

Figure 11:
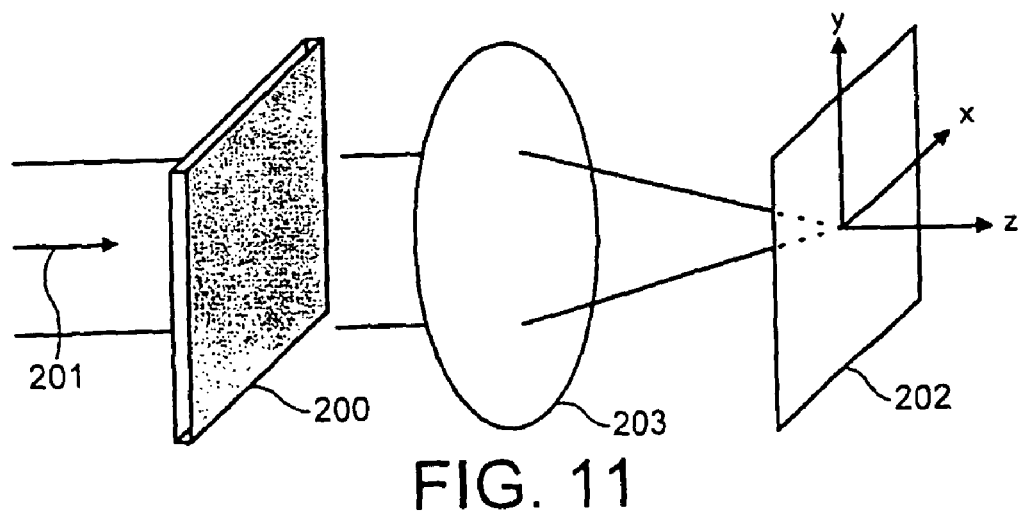
FIG. 11 shows an arrangement for viewing a computer generated hologram using collimated perpendicular light, with the replay image being formed in the focal plane of an infinite conjugate-ratio lens.

Viewing the diffraction replay image created by a CGH typically involves illuminating the CGH device with coherent or partially-coherent light, and then forming the Fraunhofer far-field diffraction image at some subsequent plane. Referring to FIG. 11, the most convenient arrangement for achieving this is to illuminate the CGH 200 with collimated perpendicular light 201, and then to form the replay image 202 in the focal plane of an infinite conjugate-ratio lens 203. According to scalar diffraction theory, the replay image is related to the complex optical transmittance of the CGH device by a scaled 2-dimensional Fourier transform. If the CGH is removed from the system then the lens focuses the light into a single 'zero-order' spot at the centre of the replay field. With the CGH in place, light is diffracted out of this spot into an optical replay distribution of intensity and phase arranged in an (x,y) transverse plane about this zero-order location. In some circumstances, the replay lens may not be present. In these cases, the replay image can be thought of as an angular spectrum of superimposed plane waves.

In a holographic optical switch, the typical requirement for the CGH pattern is for it to produce a replay field with as much optical power concentrated into a single output spot as possible. This condition minimises the routing loss through the switch and is usually achieved by defining a target field for the CGH iteration procedure which contains a single peak at the required replay peak location (equation 14):

$$\text{Target}(x,y)=\delta(x-X_p, y-Y_p) \quad (14)$$

where $\delta$ is the idealised delta-function replay peak profile, and $(X_p,Y_p)$ is the main replay spot location relative to the zero-order position.

In addition, the locations and intensities of all noise peaks within the CGH replay field must also be well quantified in order that the switch can be designed in such a way that this noise does not reach any of the switch output ports—this noise could give rise to cross talk within the switch. This design problem for holographic switches can be tackled by examining the replay fields for all the CGH patterns that will be required to operate the switch in all configurations. The switch inputs and outputs must then be placed in appropriate positions to avoid cross talk problems. However since the set of required holograms is actually determined by the positions of the inputs and outputs in the first place, this cross talk minimisation problem is an iterative process by necessity. The complexity of traditional CGH design procedures combined with the complexity of the switch design procedure means that it has not been possible to design large holographic switches according to the prior art knowledge.

In summary, using an iterative CGH design algorithm has several significant drawbacks when applied to optical switching: 1) it is difficult to control the noise distributions in the replay fields that are generated; 2) the CGH design algorithms are numerically intensive to calculate; 3) the target output spot position defined by equation (1) has limited resolution. The last point arises because the target field for the CGH algorithm is typically sampled at the same resolution as (or an integer fraction of) the actual CGH display device. Thus if the hologram display contains M pixels, then the target field also contains a maximum of M discrete and evenly spaced sample points. Using traditional approaches to CGH design, the target peak may only be located on these grid points.

A non-heuristic method for generating phase-only hologram patterns suitable for optical switch applications, has been developed based on the generation and quantisation of a mathematical phase mask. The method allows better resolution for the positioning of the target spot in the replay field, and allows CGHs to be determined rapidly, thereby allowing much greater iteration in the design and placement of the switch input and output ports. In addition, the noise fields generated by CGH patterns designed using this method can be accurately quantified in terms of noise intensity and location.

Phase-only CGHs suitable for optical switches are defined by a pixellated base-cell pattern. This base-cell is directly calculated from the co-ordinates of the main replay spot for the desired hologram, and is constructed using a rapid phase-quantisation procedure. In order to form the final CGH, the base-cell pattern is tiled or replicated in the (x,y) plane of the hologram display device until the entire aperture of the device is filled. Therefore contrary to other CGH design procedures, the design of the hologram pattern does not directly relate to the resolution of the hologram display device. Instead, the base-cell is typically tiled a non-integer number of times, and generally a different number of times in the x and y directions respectively. As a consequence of this approach, the principal CGH replay mode location is not restricted to a discrete number of locations, but can be placed anywhere within the addressable region of the CGH replay plane in a quasi-continuous manner.

Furthermore, the design of the base-cell pattern is optimised to maximise the power in a single peak (henceforth called the 'principal mode') of the CGH replay field. The precise location of this peak relative to the zero-order location is used to uniquely define the base-cell design of the hologram according to a deterministic algorithm. Furthermore, the noise properties of the replay field generated by the CGH can typically be described analytically in terms of a summation of regularly spaced peaks (henceforth called modes). Given the direct correspondence between base-cell pattern, principal mode location and noise field, it is then a relatively simple matter to construct procedures to design CGH sets for holographic switches. The speed of CGH generation, and the predictable harmonic structure of the replay field are advantageous in the design of holographic switches.

The hologram base cell pattern is calculated from the normalised angular deviation that the CGH is required to impart upon a collimated paraxial beam of light incident upon the hologram pattern. Thus if $\theta_y$ & $\theta_x$ are the (small-angle) optical diffraction angles of rotation that the CGH is to introduce about the y and x axes respectively then two dimensionless parameters $(\eta_p, \xi_p)$ at describe the principal replay mode coordinate for the desired hologram can be defined by:

$$\theta_y \approx \frac{\lambda}{P_x}\eta_p \quad \theta_x \approx \frac{\lambda}{P_y}\zeta_p \tag{15}$$

where $\lambda$ is the wavelength of light incident upon the CGH,

P is the pixel pitch of the CGH display device (along x & y axial directions).

Alternatively $(\eta_p, \xi_p)$ may be defined in terms of the physical coordinate of the principal replay spot relative to the zero-order location (equation 16):

$$X_p = \frac{f\lambda}{P_x}\eta_p \quad Y_p = \frac{f\lambda}{P_y}\zeta_p \tag{16}$$

where $(X_p, Y_p)$ is the target principal mode location for the hologram, and f is the focal length of the lens used to form the far-field diffraction image.

In order to calculate the base-cell pattern that will route light to according to equations (15) and (16), the normalised target coordinate $(\eta_p, \xi_p)$ for the principal mode should be written as rational numbers (equation 17):

$$\eta_p = N_x / D_x \quad \zeta_p = N_y / D_y \tag{17}$$

where $N_x$, $N_y$, $D_x$ and $D_y$ are integers.

However according to normal CGH diffraction theory, there is an upper limit on the maximum useful diffraction angle that may be generated by a pixellated hologram pattern. In terms of the normalised target coordinates $(\eta_p, \xi_p)$, the principal replay mode can only be located within a square region bounded by the corners (−0.5,−0.5) to (+0.5, +0.5) inclusively, where (0,0) represents the zero-order location. The 4 integers that describe the hologram base-cell must therefore satisfy equation 18:

$$-\tfrac{1}{2}D_x \leq N_x \leq \tfrac{1}{2}D_x \quad -\tfrac{1}{2}D_x \leq N_y \leq \tfrac{1}{2}D_y \quad 1 \leq D_z \leq R_x \\ 1 \leq D_y \leq R_y \tag{18}$$

where $(R_x, R_y)$ is the resolution (in number of pixels) of the hologram display device.

For cases where the normalised target coordinate of the principal mode cannot precisely be written as rational fractions, then coordinate $(\eta_p, \zeta_p)$ should be rounded until it does satisfy equations (17) and (18). However it can immediately be seen that the technique described here is advantageous compared to prior art methods of hologram generation. For example, if $R_x=R_y=25$ pixels, then simulated annealing provides a grid of only 625 locations where the target principal mode can be located. In contrast, the technique described here provides a potential capability of 10,000 target locations. When $R_x=R_y=100$ then the advantage is even more convincing −10,000 locations vs. 2,316,484.

$D_x$ and $D_y$ specify the size (number of pixels) of the base-cell pattern required to define the hologram. In general, the smaller the values of $D_x$ and $D_y$, the more robust the hologram will be against any image errors within the hologram device, and the cleaner the replay field generated, i.e. fewer noise peaks will be present in the replay. The rational fractions of equation (40) must be simplified to their lowest denominator forms, or the procedure for generating the base-cell pattern will produce incorrect results, i.e. $D_x$ must not be an integer multiple of $N_x$ and $D_y$ must not be an integer multiple of $N_y$.

Figure 12:
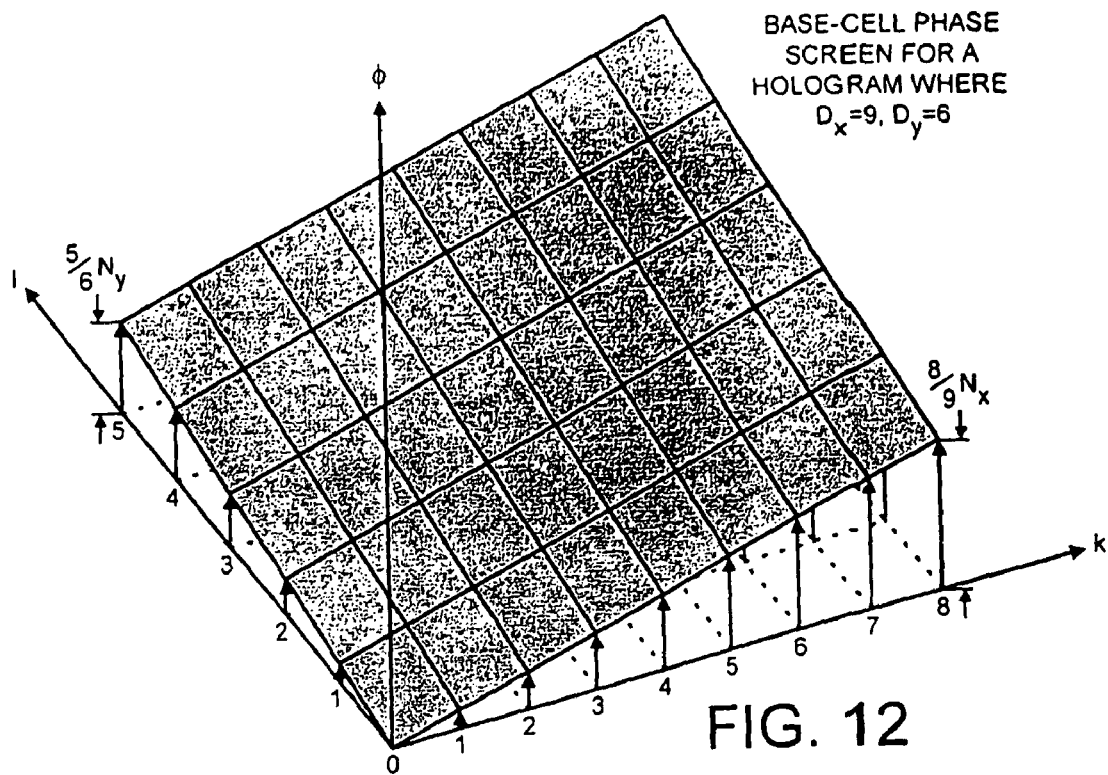
FIG. 12 shows a phase-screen for a hologram using the method of the invention.

The unique base-cell pattern for routing light to coordinate $(\eta_p, \zeta_p)$ is now calculated in 2 steps. Firstly, (Equation 19) a spatially sampled phase-screen $\Phi$ is defined in terms of the above rational fractions. This phase-screen contains $(D_x \times D_y)$ sample points, which correspond to the pixels of the base-cell pattern. A typical phase-screen is shown graphically in FIG. 12.

$$\phi(k, l) = k\frac{N_x}{D_x} + l\frac{N_y}{D_y} \tag{19}$$

Where k=0,1,2 . . . ($D_x$−1), and l=0,1,2 . . . ($D_y$−1).

In the second step, the phase-screen is phase-quantised to the same number of discrete, uniformly distributed phase-levels, $\Psi$, that are supported by the device that the hologram will be displayed on:

$$\phi_s(k,l) = \exp(2\pi j \times int\{\Phi(k,l) \times \Psi\}/\Psi) \tag{20}$$

where $\phi_s(k,l)$ is the final sampled and quantised representation of the base-cell pattern for the target hologram device, & j is the complex operator $(-1)^{1/2}$, & exp ( . . . ) is the exponential operator, & int { . . . } is a quantisation function that rounds its argument to the nearest integer towards minus infinity.

Table 2 below gives some design examples of base-cell hologram images for binary-phase devices. Here the base-cell patterns are expressed in terms of the relative phase-angle that the hologram display device must impart at each pixel. These phase angles are defined as:

$$\arg\{\varphi_s(k, l)\} = \arctan\{\text{Imag}\{\varphi_s\}/\text{Real}\{\varphi_s\}\} \quad (21)$$

| | CGH Base-Cell Design, arg{φ_s(k,l)} | |
|---|---|---|
| | $\eta_\rho = 0.5$, $\zeta_\rho = 0.5$ | $\eta_\rho = 0.375$, $\zeta_\rho = -0.25$ i.e. (⅜,-¼) |
| Binary-phase (ψ = 2) | π 0 0 π<br>0 π π 0<br>π 0 π π<br>0 0 π 0 | 0 0 π 0 π π<br>0 π 0 0 π 0<br>0 π 0 π 0 0<br>π 0 π π 0 π |

Figure 13:
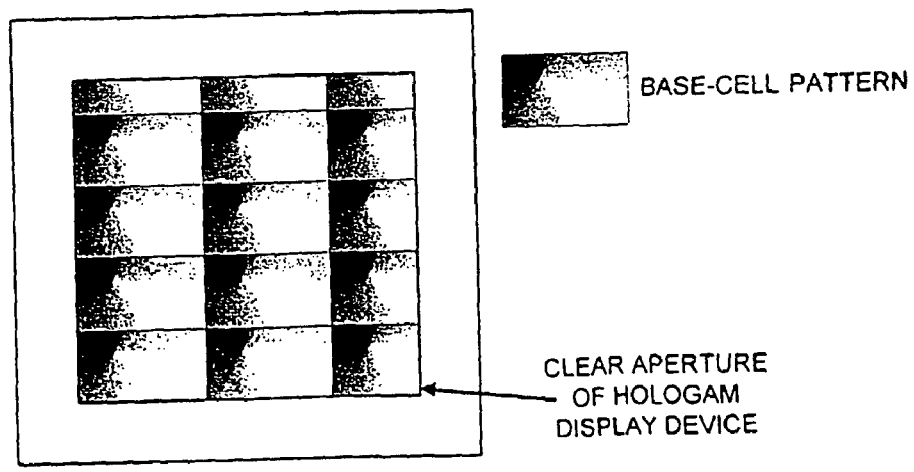
FIG. 13 shows a replicated or tiled base cell pattern across the aperture of a hologram device.

To form the final hologram image on the display device, the base-cell pattern must be tiled to fill the entire available hologram aperture. This replication will typically occur a non-integer number of times, and generally a different number of times in the x and y directions, FIG. 13.

Fourier theory predicts that a non-integer number of replications of the base-cell will typically cause a phenomenon known as 'spectral leakage,' whereby a distortion of the spectral domain (i.e. the replay field) occurs unless a 'windowing' function is employed. The holograms generated are thus not illuminated by plane waves, but instead by beams exhibiting apodisation. This apodisation provides the required windowing function and ensures that the replays of the base-cell and of the final hologram image correspond.

One example of a suitable apodisation function is the $\text{TEM}_{00}$ Gaussian mode profile. This is a good approximation to the fundamental optical profile emitted by most lasers, waveguides and cleaved fibres. A circularly symmetric $\text{TEM}_{00}$ Gaussian intensity profile is usually defined in terms of a beam radius, w, as in equation 22:

$$E_i(x, y) = \left|\exp\left(-\frac{x^2 + y^2}{w^2}\right)\right|^2 \quad (22)$$

If this Gaussian field is incident upon a hologram device having a total optical aperture of A, then a useful measure of the effect of the windowing function can be gauged from the parameter γ, where (equation 23):

$$\gamma = \frac{w}{A} \quad (23)$$

Empirically, it is found that values of γ≈3 and above provide adequate Gaussian apodisation. This Gaussian apodisation meets the windowing function requirement that the optical field intensity must tend towards zero at the edges of the hologram device aperture. Other optical profiles may also be employed provided this condition is met.

Provided the apodisation function is appropriate, then the location of the principal mode generated by the composite tiled hologram will be the same as the location of the principal mode that was used to design the base-cell pattern, subject to any limitations of scalar diffraction theory. In the case of Gaussian apodisation, it is empirically found that approximately 2 complete replications of the base-cell pattern should be present in the final hologram image in order to produce a reliable replay image. However provided this constraint is observed, then the replay spots have profiles determined by the apodisation function, but the spot locations generated by the apodised CGH are the same as predicted by analysis of the base-cell pattern alone.

Holograms designed according to the steps outlined above typically exhibit a regularly spaced array of noise peaks in their replay images. In terms of normalised coordinates, if the principal mode is located at a position denoted by the fraction N/D, then noise modes may also arise at fractional locations n/D, where n is any integer between minus infinity and plus infinity such that n≠N. However not all indicated fractional locations may actually exhibit noise. The presence or absence of a particular noise mode in the hologram replay can be predicted by examining the Fourier series for the base-cell pattern, i.e. the presence or absence of specific harmonics in the Fourier series reveals the presence or absence of the corresponding noise modes in the final hologram replay.

Binary-phase holograms are particularly important because they may be displayed on reconfigurable hologram display devices such as ferroelectric liquid-crystal spatial-light-modulators see O'Brien et al for example. The basic modal structure for a binary-phase hologram replay image can be derived analytically from the target peak position coordinates $(\gamma_p, \zeta_p)$ using Fourier theory. If D is calculated as the lowest common multiple of $D_x$ and $D_y$ given in equation (17), then the positions and relative intensities of the replay modes are given by equation 24:

If D is an even integer: (24)

$$\text{Modes}(\eta, \zeta) = \text{Env}(\eta, \zeta) \times \sum_{m=1}^{D/2} \sum_{p=-\infty}^{\infty} \sum_{q=-\infty}^{\infty} \left\{\frac{2}{D\sin\left(\frac{(2m+1)}{D}\pi\right)}\right\}^2 \times$$

$$\delta(p + \eta - (2m+1)\eta_p, q + \zeta - (2m+1)\zeta_p)$$

If D is an odd integer:

$$\text{Modes}(\eta, \zeta) = \text{Env}(\eta, \zeta) \times \sum_{m=1}^{D} \sum_{p=-\infty}^{\infty} \sum_{q=-\infty}^{\infty} \left\{\frac{0.5}{D\sin\left(\frac{(2m+1)}{2D}\pi\right)}\right\}^2 \times$$

$$\delta(p + \eta - (2m+1)\eta_p, q + \zeta - (2m+1)\zeta_p)$$

The function $\text{Env}(\eta,\zeta)$ is an intensity envelope function calculated as the optical diffraction image of a single CGH pixel aperture. For square or rectangular pixels, this function is given by equation 25:

$$\text{Env}(\eta,\zeta) = (\tau_x \tau_y \text{sinc}(\pi\tau_x\eta) \text{sinc}(\pi\tau_y\zeta))^2 \quad (25)$$

where τ is a pixel "fill-factor" term defined as the ratio of the pixel aperture that modulates light divided by the pixel separation.

Equation (24) only includes the mode locations and signal/noise powers. It does not include the mode-shaping or broadening effects caused by apodisation of the CGH illumination. Analysis of these effects generally requires a full diffraction calculation of the composite hologram image. However, the relatively simple modal representation of the hologram replay distribution derived from the base-cell pattern (and equivalent expressions derived for hologram displays capable of more than 2 phase-levels) is usually adequate to describe the performance of the CGH, and considerably reduces the calculation time required to design hologram sets for optical switches.

In a first application, a reconfigurable CGH pattern designed according to the above procedure is used as an adaptive optical element in order to route an optical beam or signal into an output port, optical receiver or detector. In this case using an illuminated CGH display, a Fourier replay lens and an output port or ports which are located in the plane of the hologram replay image, a hologram or set of holograms are then displayed in order to locate the principal mode (or other replay mode) into the output port. In embodiments of the present technique, the principal mode can be located into the output port with much greater resolution and precision than is achievable using alternative hologram design techniques. Using this technique, the principal mode can typically be located around the (x,y) plane of the replay image with sub-micron accuracy. This high resolution is particularly important for alignment critical systems such as applications where the output receiver is a single-mode optical fibre.

In a second application, an array of optical receivers or detectors is placed in the replay plane of the hologram and the principal mode (or other replay mode) is scanned about (x,y) in order to characterise the individual positions of the array elements. In this embodiment, a device such as a single-mode fibre array can be tested by varying the CGH in order to maximise the optical return signal in each fibre output and thereby determine the relative positions of the array elements. In this way, it is possible to assess any alignment errors or defects in the locations of the array elements.

In a third application, the principal replay mode (or other replay mode) is scanned about (x,y) in order to determine the numerical aperture, linear aperture, or acceptance mode-distribution of an output receiver or detector.

In a fourth application, simulated annealing or other CGH design procedure is applied to the base-cell pattern of the hologram (rather than to the hologram itself) in order to suppress a particular noise mode or modes, or otherwise to alter the distribution of optical power within the replay image.

In a fifth application, the shift-invariant nature of the CGH image is utilised in order to change or update the hologram image without altering the replay intensity distribution. In this case, the base-cell pattern is placed at different locations within the CGH aperture before it is tiled to fill the available display aperture. Each CGH thus generated is a shifted and apertured version of the other CGHs, but the replay intensity image remains unaltered to all intensive purposes no matter which hologram is displayed. A further set of hologram patterns can also be calculated such that when they are displayed in sequence, all pixels of the hologram device spend an equal (or otherwise specified) amount of time in each hologram phase state. The sequence may then be repeated for as long as necessary. This application is particularly important for CGH devices such as FLC-SLMs, where the phase-modulating pixels must be continuously switched in order to maintain a net AC voltage at each pixel, but where it may be desirable to maintain a constant replay image.

Figure 14:
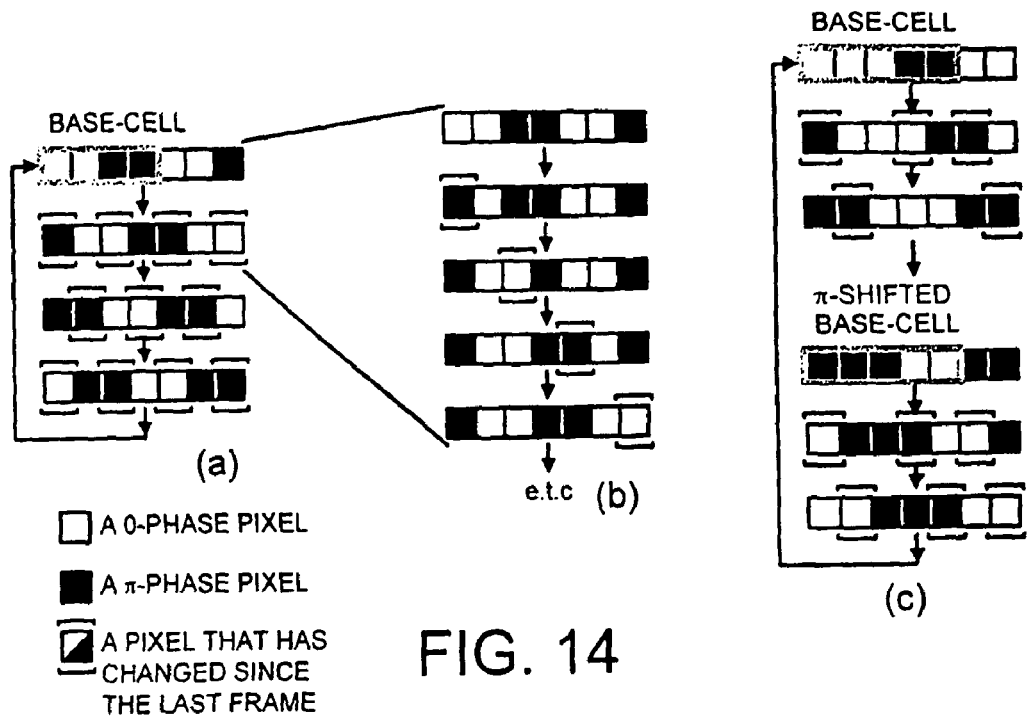
FIGS. 14a–c show exemplary base cell frame sequences.

It is well known to those skilled in the art that it is undesirable for liquid crystal devices to have a constant potential applied to them so that they remain in a predetermined bias state for long periods of time. It is also known to those skilled in the art that holograms are translation-invariant. An advantageous technique is thus to scroll the hologram pattern (in either 1- or 2-dimensions as appropriate) across the display device by one or more pixels at a time and at regular intervals. Circuitry is accordingly provided for this purpose. Such operation has no effect on the functionality, by contrast to what would happen in a display application, where the viewer would see movement taking place. The sequence of frames typically repeats when the shifted base-cell pattern used to generate each frame exactly coincides with a tiled version of the base-cell used to generate the first frame, i.e. the hologram has shifted by an integer number of base-cell lengths. FIG. 14(a) demonstrates a frame sequence for a binary-phase hologram device with 7 pixels displaying a (0.25,0) hologram. In this figure, the base-cell pattern shifts rightwards by 1 pixel between each frame and the next. Note that each column of the sequence in this example achieves an equal overall amount time in each phase state.

For devices such as FLC-SLMs, it may also be desirable to minimise the number of pixels that must undergo phase-state changes per frame change whilst still achieving a near-constant replay field. This is particularly important in applications where there is continuous optical data stream passing through the system. For these applications it may be necessary to "evolve" each frame into the next by altering one, or a group, of pixels at a time, rather than instantaneously displaying the whole of the next frame. FIG. 14(b) shows a partial sequence of the extra frames that could be inserted into the sequence of FIG. 14(a) in order to reduce the number of pixels that change at a time. In this example, only 1 pixel changes at a time in order to evolve frame #1 of FIG. 14(a) into frame #2. Using the sequence of FIG. 14(b), there may be some distortion of the replay image due to the imperfect intermediate holograms that are introduced. However, such distortion may be minimised by careful choice of the frame sequence.

For some base-cell patterns, simply shifting the hologram may not be sufficient to produce an equal duration in all phase states. In this case, it may be necessary to introduce versions of the base-cell that have been adjusted by a phase-offset of $(2\pi.u)/\Psi$ . . . where u is an integer in the range 1 . . . $\Psi$. Because the offset is applied to all pixels, it doesn't alter the replay image. However, it does alter the representation of the base-cell. FIG. 14(c) shows an example for a binary-phase (0.2,0) hologram that combines the phase-offset method with frame shifting.

In a sixth application, such holograms are used to construct an optical switch. Optical switches are emerging as an important enabling technology for optical networks. Holographic optical switches that use reconfigurable CGHs to route beams of light in free-space between arrays of optical inputs and arrays of optical outputs have several important performance advantages compared to competing technologies such as scalability and high signal to noise margins. A 1×M holographic switch is described in "Polarisation insensitive operation of ferroelectric liquid crystal devices", S. T. Warr and R. J. Mears, Electronics Letters 31:9(1995) p. 714–715 and an M×M switch has also been described.

Up until the present time, the complexity of hologram design algorithms, the limited 'resolution' available in the CGH replay field, and the full scalar-wave diffraction theory required to analyse the replay images has made it impossible to design holographic switches with large numbers of inputs and outputs. However, the currently described technique is capable of providing much better prospects for designing these large holographic switches.

According to "Polarisation insensitive operation of ferro-electric liquid crystal devices", S. T. Warr and R. J. Mears, Electronics Letters 31:9(1995) p. 714–715, a 1×M switch comprises an input signal which is collimated to illuminate a reconfigurable CGH; a Fourier lens to form the replay image; and an array of optical outputs. The array of outputs are placed in the replay plane of the hologram and various CGH images are displayed in order to route the input signal to one or more of the output ports. The 1×M switch therefore requires a set of at least M different hologram images so that the input signal may be routed to each of the output ports. The switch must be designed in such a way that the outputs coincide with the locations of the principal replay modes of the hologram set, but also in such a way that the noise modes generated by any hologram in this set never gives rise to a significant output signal. The challenge then is to design a set of "orthogonal" holograms suitable for providing the switching function without introducing crosstalk.

Thus, the design of a set of holograms to implement a 1×M switch is reduced to the problem of determining a set of M fractions defined by equation (17) which represent both the CGH patterns required to operate the switch, as well as the proper locations for the output ports as given by equation (16). Typically there are a number of constraints that must be satisfied by the chosen set of fractions, including but not limited to:

- there may be some limit to the minimum allowable physical distance between any pair of output ports related to the physical dimensions (or other property) of these ports,
- there may be some finite number of CGH pixels available which places a limit on the set of fractions that can be considered during the design procedure according to equation (19),
- there may be some maximum allowable variation of optical insertion loss through the switch as it is configured between the various outputs. Because the optical power diffracted into the principal replay mode generally declines with increased angular deflection, this constraint may determine the largest fraction that can be considered in the design,
- there may be some time-limit allocated to complete the design, and therefore less useful fractions such as those with large denominators (which exhibit a greater number of noise modes) may be automatically excluded from the design process,
- there may be additional constraints introduced by the CGH display device, such as the automatic production of a large zero-order spot, which may influence the final choice of fractions,
- there may be some crosstalk specification for the switch which determines how close any noise mode generated by any hologram in the set may be located relative to one of the output ports.

The set of fractions determines both the positions of the output ports and the positions of the noise modes relative to these outputs. In order to minimise crosstalk, the design procedure must therefore be iterative. Thus the search for a suitable set of fractions for the 1×M switch given the above constraints can be solved using a goal-search procedure such as any one of a number of well-known heuristic algorithms (examples include recursive functions and tree-searches). In this case, a simple analytical expression for the location and intensity of the noise modes such as given by equation (24) for binary-phase devices, can greatly reduce the calculation time required to design the hologram set.

A similar approach can also be employed to design M×M switches. An M×M switch comprises an array of optical input signals; an array of reconfigurable CGHs displayed on a first hologram device; a free-space interconnect region; an array of reconfigurable CGHs displayed on a second hologram device; and an array of optical outputs. The input signals are collimated to illuminate the array of CGHs on the first device, are deflected by the hologram images on this device and then propagate across the interconnect region where they are allowed to spatially reorder. The second array of CGHs then deflects the signals into the output ports. In order to route any input to any output, the optical signal must be deflected through some angle at the first CGH device, and then typically through an equal and opposite angle at the second CGH device.

For design of an M×M switch, the input port locations may be represented in normalised coordinates by $(\eta_i, \xi_i)$ and the output port locations by $(\eta_o, \xi_o)$. The holograms required to route an input to an output according to the invention are therefore $(\eta_o - \eta_i, \xi \ldots o-, \xi_i)$ and $(\eta_i - \eta_o, \xi_i-, \xi_o)$ displayed in the correct array positions upon the first and second hologram devices respectively. In addition, the first hologram generates a set of noise modes which propagate in different directions and arrive at the second device in various spatial locations. The second hologram also has a set of noise modes which allow different optical propagation directions to reach the output port. Thus for each of the $M^2$ different connection paths between an input port and an output port, the noise modes generated by the 2 hologram devices must be checked that they do not give rise to an unacceptable crosstalk signal in any of the other output ports.

Thus even using a simplified expression for the noise modes such as equation (24), the iterative placement of input and output ports for an M×M switch is a formidable task. However in many applications it is desirable for the input and output ports to be arranged on a regular grid, e.g. $\eta_i = \eta_o = 1/13, 2/13, 3/13$ etc. Unfortunately, the noise modes generated by the holograms required to interconnect ports arranged in a regular fashion tend to route noise straight into other output ports, thereby leading to severe crosstalk problems. The solution disclosed here is to choose a denominator for the fractional locations of the input and output ports which is divisible by 2,3,4, etc. such that the noise mode distribution is more favourable. An example of a 32×32 switch configuration that exhibits very high signal-to-noise margins by using a denominator of 60 (−3×4×5) is given in table 3.

An alternative technique employs a Fourier Series 'picture' of a beam-steering switch.

The physics is a 2-D version of X-ray diffraction from a crystalline lattice of atoms, so the same notation and analysis methods can be used.

The input to the SLM is the far-field from the fibre or input waveguide, call this Fib(x,y).

The SLM is treated as an infinite, periodic, phase-modulation, Ph(x,y, Λ), of period Λ, multiplied by a top-hat function, Top(x,y), representing the finite extent of the SLM.

Hence the electric field just after phase modulation is given by equation 26 as $$Fib(x,y) \cdot Ph(x,y, \Lambda) \cdot Top\ (x,y) = (Fib(x,y) \cdot Top(x,y)) \cdot Ph(x,y, \Lambda) \quad (26)$$

where the · represents multiplication.

The output from the switch is the FT (Fourier Transform) of the electric field just after phase modulation is given by expression 27 as $$FT(Fib(x,y) \cdot Top(x,y)) * FT(Ph(x,y, \Lambda)) \quad (27)$$

where the * symbol represents convolution.

Now, because the phase modulation Ph(x,y, Λ) is periodic and of infinite extent, the FT is an infinite set of delta functions of separation in ksinθ space of 2π/Λ, centred on the origin given by equation 28:

$$FT\left(Ph(x, y, \Lambda)\right) = \sum_{i=-\infty}^{\infty} \sum_{j=-\infty}^{\infty} p_{ij} \delta\left(\sin\theta_X - \frac{j\lambda}{\Lambda_X}, \sin\theta_Y - \frac{i\lambda}{\Lambda_Y}\right) \quad (28)$$

where λ is the optical wavelength, $\theta_X$ is the beam-steering angle from the x-axis, measured in the x-z plane, $\theta_Y$ is the beam-steering angle from the y-axis, measured in the y-z plane. In its most general form Λ can be represented as a vector: $\Lambda_X$ and $\Lambda_Y$ are the x and y components of the period vector Λ.

TABLE 3

Input and outport locations for a 32 × 32 switch.

| Input Port Locations ($\eta_i$, $\zeta_i$) | Output Port Locations ($\eta_o$, $\zeta_o$) |
|---|---|
| (−1/60 , −1/12) | (+1/60 , −1/12) |
| (−1/30 , −1/12) | (+1/30 , −1/12) |
| (−1/20 , −1/12) | (+1/20 , −1/12) |
| (−1/60 , −1/15) | (+1/60 , −1/15) |
| (−1/30 , −1/15) | (+1/30 , −1/15) |
| (−1/20 , −1/15) | (+1/20 , −1/15) |
| (−1/60 , −1/20) | (+1/60 , −1/20) |
| (−1/30 , −1/20) | (+1/30 , −1/20) |
| (−1/20 , −1/20) | (+1/20 , −1/20) |
| (−1/60 , −1/30) | (+1/60 , −1/30) |
| (−1/30 , −1/30) | (+1/30 , −1/30) |
| (−1/20 , −1/30) | (+1/20 , −1/30) |
| (−1/60 , −1/60) | (+1/60 , −1/60) |
| (−1/30 , −1/60) | (+1/30 , −1/60) |
| (−1/20 , −1/60) | (+1/20 , −1/60) |
| (−1/60 , 0) | (+1/60 , 0) |
| (−1/30 , 0) | (+1/30 , 0) |
| (−1/20 , 0) | (+1/20 , 0) |
| (−1/60 , +1/60) | (+1/60 , +1/60) |
| (−1/30 , +1/60) | (+1/30 , +1/60) |
| (−1/20 , +1/60) | (+1/20 , +1/60) |
| (−1/60 , +1/30) | (+1/60 , +1/30) |
| (−1/30 , +1/30) | (+1/30 , +1/30) |
| (−1/20 , +1/30) | (+1/20 , +1/30) |
| (−1/60 , +1/20) | (+1/60 , +1/20) |
| (−1/30 , +1/20) | (+1/30 , +1/20) |
| (−1/20 , +1/20) | (+1/20 , +1/20) |
| (−1/60 , +1/15) | (+1/60 , +1/15) |
| (−1/30 , +1/15) | (+1/30 , +1/15) |
| (−1/20 , +1/15) | (+1/20 , +1/15) |
| (−1/60 , +1/12) | (+1/60 , +1/12) |
| (−1/30 , +1/12) | (+1/30 , +1/12) |

Due to the periodicity of the phase modulation we can use Fourier series to calculate the amplitude, $p_{ij}$, of each of these delta functions: the answer is exact, assuming diffraction in the Fraunhofer limit. For large beam-steering angles the Fresnel obliquity factor ((1+cosθ)/2) should be included, but SLM pixels are not small enough for this to be relevant. This obliquity factor (which arises from the electromagnetic scattering properties of a Hertzian dipole) is the only fundamental reason for a maximum beam-steering efficiency that decreases with beam-steering angle.

Let the optical system be such that a beam-steering angle θ is converted to a transverse position, L tanθ. Assuming sinθ≈tanθ we then have a set of delta functions at output positions (u,v) given by equation 29:

$$FT\left(Ph(x, y, \Lambda)\right) = \sum_{i=-\infty}^{\infty} \sum_{j=-\infty}^{\infty} p_{ij} \delta\left(u - \frac{jL\lambda}{\Lambda_x}, v_y - \frac{iL\lambda}{\Lambda_y}\right) \quad (29)$$

The net output is the above, convolved with the FT(Fib(x,y)·Top(x,y)): call this g(u,v), or in words, the output 'spot'. Hence what we get is g(u,v) (the output spot) replicated all over the output plane with an amplitude (and phase) depending on the value of the Fourier coefficients of the periodic phase modulation according to equation 30:

$$\text{output} = \sum_{i=-\infty}^{\infty} \sum_{j=-\infty}^{\infty} p_{ij} g\left(u - \frac{jL\lambda}{\Lambda_x}, v_y - \frac{iL\lambda}{\Lambda_y}\right) \quad (30)$$

A transverse translation of the phase modulation Ph(x,y, Λ) changes the phase of the Fourier coefficients $P_{ij}$, and hence the phase of the output spots, but not their amplitude. As long as the separation of the delta functions is greater than the significant extent (in transverse width) of the output spots, each spot can be considered independent, and hence the coupling efficiency into the output fibre or waveguide is not affected by transverse translation of the phase modulation.

To design a switch using beam-steering, the general objective is to position a set of output fibres or waveguides so that for each configuration of the SLM, the selected output fibre or waveguide will receive ONE of these replications of g(u,v) (one of the output spots), and to minimise (or keep below a set threshold) the power coupled from any other (unwanted) replication of g(u,v) into any other output fibre or waveguide.

A method has been previously presented (M J Holmes et al "Low crosstalk devices for wavelength routed networks" IEE Colloquium, Jun. 8th, 1995) so that the unwanted output spots will never couple perfectly (i.e. in perfect alignment) into any other waveguide or output fibre. The method in the paper was for a 1:N beam-steering switch with output into a non-regular 2-D array of output fibres or waveguides. We discuss here:

(i) a special case of the earlier method allowing beam-steering into a regular 2-D array of output fibres or waveguides. It is this regularity of the output fibre spacing that allows the crosstalk suppression method to be further applied to an N:N switch.

(ii) an extension of the earlier method in that it is recognised that even diffraction orders tend to be very weakly generated, particularly when the period of the phase modulation is an even number of pixels. This increases the number of allowable periods.

What is claimed is:

1. An optical switch comprising an input optical fiber array, the input optical fiber array having plural input optical fibers, an output optical fiber array, and an optical system connecting the input optical fiber array to an output optical fiber receiver array wherein the optical system comprises a first bulk collimating lens, a first ferroelectric liquid crystal spatial light modulator, a first bulk focusing lens, a second bulk collimating lens, a second ferroelectric liquid crystal spatial light modulator, an interconnect region between said first and second ferroelectric liquid crystal spatial light modulators, and a second bulk focusing lens; wherein the plural input optical fibers of said input optical fiber array in use provide light, said first collimating bulk lens is disposed to receive said light from all of the plural input optical fibers of the input optical fiber array, said first bulk collimating lens is disposed to provide a plurality of collimated light beams from said input optical fiber array, each spatial light modulator is adapted for providing a respective selectable set of holograms, the first bulk focusing lens is disposed to receive light beams from the first ferroelectric liquid crystal spatial light modulator, the second bulk collimating lens is disposed to receive light beams from the first bulk focusing lens and provide a light beam to the second ferroelectric liquid crystal spatial light modulator and the second bulk focusing lens is disposed to provide output light to the output optical fiber array.

2. The optical switch of claim 1, wherein said spatial light modulators are transmissive.

3. The optical switch of claim 1, wherein the optical system has an optical axis, and the input and output optical fiber arrays are mutually offset to opposite sides of the optical axis, other components remaining on-axis.

4. The optical switch of claim 1, wherein the spatial light modulators are reflective.

5. The optical switch of claim 4, wherein the optical system has a zigzag axis, and each of said first bulk focusing lens and second bulk collimating lens is disposed with respect to an associated spatial light modulator such that light travelling along said axis passes twice through each of said lenses.

6. The optical switch of claim 4, wherein each of said first bulk focusing lens and second bulk collimating lens has an associated further lens disposed to form an optical magnification stage.

7. The optical switch of claim 4, wherein a relay lens is disposed in the interconnect region.

8. The optical switch of claim 7, wherein said relay lens is disposed off-axis.

9. The optical system of claim 4, wherein a field lens is disposed in the interconnect region.

10. The optical switch of claim 9, wherein said field lens is disposed off-axis.

11. The optical switch of claim 1, wherein said input optical fiber array and said output optical fiber array have respective input and output ports each comprising a respective 32×32 array of ports, and said ports are disposed at normalized co-ordinate locations defined by:

| Input Port Locations $(\eta_i, \xi_i)$ | Output Port Locations $(\eta_o, \xi_o)$ |
|---|---|
| $(-1/60, -1/12)$ | $(+1/60, -1/12)$ |
| $(-1/30, -1/12)$ | $(+1/30, -1/12)$ |
| $(-1/20, -1/12)$ | $(+1/20, -1/12)$ |
| $(-1/60, -1/15)$ | $(+1/60, -1/15)$ |
| $(-1/30, -1/15)$ | $(+1/30, -1/15)$ |
| $(-1/20, -1/15)$ | $(+1/20, -1/15)$ |
| $(-1/60, -1/20)$ | $(+1/60, -1/20)$ |
| $(-1/30, -1/20)$ | $(+1/30, -1/20)$ |
| $(-1/20, -1/20)$ | $(+1/20, -1/20)$ |
| $(-1/60, -1/30)$ | $(+1/60, -1/30)$ |
| $(-1/30, -1/30)$ | $(+1/30, -1/30)$ |
| $(-1/20, -1/30)$ | $(+1/20, -1/30)$ |
| $(-1/60, -1/60)$ | $(+1/60, -1/60)$ |
| $(-1/30, -1/60)$ | $(+1/30, -1/60)$ |
| $(-1/20, -1/60)$ | $(+1/20, -1/60)$ |
| $(-1/60, 0)$ | $(+1/60, 0)$ |
| $(-1/30, 0)$ | $(+1/30, 0)$ |
| $(-1/20, 0)$ | $(+1/20, 0)$ |
| $(-1/60, +1/60)$ | $(+1/60, +1/60)$ |
| $(-1/30, +1/60)$ | $(+1/30, +1/60)$ |
| $(-1/20, +1/60)$ | $(+1/20, +1/60)$ |
| $(-1/60, +1/30)$ | $(+1/60, +1/30)$ |
| $(-1/30, +1/30)$ | $(+1/30, +1/30)$ |
| $(-1/20, +1/30)$ | $(+1/20, +1/30)$ |
| $(-1/60, +1/20)$ | $(+1/60, +1/20)$ |
| $(-1/30, +1/20)$ | $(+1/30, +1/20)$ |
| $(-1/20, +1/20)$ | $(+1/20, +1/20)$ |
| $(-1/60, +1/15)$ | $(+1/60, +1/15)$ |
| $(-1/30, +1/15)$ | $(+1/30, +1/15)$ |
| $(-1/20, +1/15)$ | $(+1/20, +1/15)$ |
| $(-1/60, +1/12)$ | $(+1/60, +1/12)$ |
| $(-1/30, +1/12)$ | $(+1/30, +1/12)$ | where $(\eta_i, \xi_i)$ are the input port coordinates and $(\eta_o, \xi_o)$ are the output port coordinates.

12. An optical switch comprising an input optical fiber array, the input optical fiber array having plural input optical fibers, and an output optical fiber array, and an optical system connecting the input optical fiber array to the output optical fiber array wherein the optical system comprises first to fifth lenses, the first lens being a first bulk lens for receiving light from all of the plural input optical fibers of the input optical fiber array, a first ferroelectric liquid crystal spatial light modulator, and a second ferroelectric liquid crystal spatial light modulator, each spatial light modulator being adapted for providing a respective selectable set of holograms, wherein the first bulk lens is disposed to receive light from all of the plural input optical fibers and to provide a plurality of collimated light beams from said input optical fiber array to be incident upon the first ferroelectric liquid crystal spatial light modulator, said first ferroelectric liquid crystal spatial light modulator providing a corresponding plurality of light beams, a second lens, a third lens and a fourth lens, the said second lens being disposed to receive said corresponding plurality of light beams and to provide a corresponding plurality of mutually convergent beams, the third lens having a negative power, said third lens disposed to receive said convergent beams and to provide plural mutually divergent output beams, and the fourth lens being disposed to receive said plural mutually divergent beams and collimate said plural mutually divergent beams to be incident upon said second liquid crystal spatial light modulator, said second ferroelectric liquid crystal spatial light modulator providing a corresponding plurality of light beams, the fifth lens being disposed for focussing said corresponding plurality of light beams from said second ferroelectric liquid crystal spatial light modulator onto said output optical fiber array.

13. The optical switch of claim 12, wherein the optical system has an optical axis, the input and output optical fiber arrays, the first, second, fourth and fifth lenses are disposed on the optical axis and the third lens is laterally offset therefrom.

14. An optical switch comprising an input optical fiber array, the input optical fiber array having plural input optical fibers, an output optical fiber array, and an optical system connecting the input optical fiber array to the output optical fiber array wherein the optical system comprises a first bulk lens for receiving light from all of said plural input optical fibers of the input optical fiber array, a first ferroelectric liquid crystal spatial light modulator, a second ferroelectric liquid crystal spatial light modulator, each spatial light modulator being adapted for providing a respective selectable set of holograms, an interconnect region between said first and second ferroelectric liquid crystal spatial light modulators, and a second bulk lens providing output light to the output optical fiber array wherein the first bulk lens is disposed to provide a plurality of collimated light beams from said input optical fiber array, said optical switch further comprising a second lens and a fourth lens, the said second lens for receiving said collimated light beams and providing a corresponding plurality of mutually convergent beams, the optical system further comprising a third lens having a positive power, receiving said convergent beams and providing mutually divergent output beams as a unity conjugate lens, and the fourth lens being disposed for receiving said mutually divergent beams and collimating said beams wherein said second bulk lens is a fifth lens being disposed for focussing said beams onto said output optical fiber array.

15. The optical switch of claim 14, wherein the optical system has an optical axis, the input and output optical fiber arrays, the first, second, fourth and fifth lenses are disposed on the system optical axis and the third lens is laterally offset therefrom.

16. An optical switch comprising an input optical fiber array and a receiver array, and an optical system connecting the input optical fiber array to the receiver array wherein the optical system comprises a first binary reconfigurable spatial light modulator, a second binary reconfigurable spatial light modulator, each spatial light modulator being adapted for providing a respective selectable set of holograms each for a desired switching operation, and a pair of lenses between said first and second binary reconfigurable spatial light modulators for defining therebetween an interconnect region, wherein each spatial light modulator comprises a display screen, memory circuitry for storing a plurality of sets of hologram data, and selection circuitry for selecting one of said sets according to a desired switching function, each stored set of hologram data being calculated by:

determining principal replay co-ordinates of a said hologram according to a desired switching function;
  using said co-ordinates, calculating the size in pixels of a base cell;
  evaluating a base cell pattern by a phase-quantization procedure; and
  replicating said base cell pattern data until the entire aperture of the spatial light modulator is filled.

17. The optical switch of claim 16 wherein said step of determining principal replay co-ordinates of a desired hologram comprises determining the normalized angular deviation upon a collimated paraxial beam required of a desired hologram; deriving from said deviation the principal replay mode co-ordinates for said desired hologram.

18. The switch of claim 16, having circuitry for scrolling the hologram pattern across the display device by one or more pixels at a time.

19. An optical switch comprising an input optical fiber array and a receiver array, and an optical system connecting the input optical fiber array to the receiver array wherein the optical system comprises a first ferroelectric liquid crystal spatial light modulator, a second ferroelectric liquid crystal spatial light modulator, each spatial light modulator being adapted for providing a respective selectable set of holograms each for a desired switching operation, and a pair of lenses between said first and second ferroelectric liquid crystal spatial light modulators for defining therebetween an interconnect region, wherein each spatial light modulator comprises a display screen, memory circuitry for storing a plurality of sets of hologram data, and selection circuitry for selecting one of said sets according to a desired switching function, each stored set of hologram data being calculated by:

determining principal replay co-ordinates of a said hologram according to a desired switching function;
  using said co-ordinates, calculating the size in pixels of a base cell and evaluating a base cell pattern by a phase-quantization procedure; and
  replicating said base cell pattern data until the entire aperture of the spatial light modulator is filled.

20. The optical switch of claim 19 wherein said step of determining principal replay co-ordinates of a desired hologram comprises determining the normalized angular deviation upon a collimated paraxial beam required of a desired hologram; deriving from said deviation the principal replay mode co-ordinates for said desired hologram.

21. The switch of claim 19, having circuitry for scrolling the hologram pattern across the display device by one or more pixels at a time.

22. A method of producing a phase-only computer generated hologram for a pixellated hologram device, having a respective (x,y) plane and a predetermined number of uniformly distributed phase levels, the method comprising:

determining principal replay co-ordinates of a desired hologram;
  using said co-ordinates:
    calculating the size in pixels of a base cell; and
    evaluating a base cell pattern by a phase-quantization procedure; and
  replicating said base cell in the plane of the said hologram device until the entire aperture of the device is filled.

23. The method of claim 22 wherein said step of determining principal replay co-ordinates of a desired hologram comprises:

determining the normalized angular deviation upon a collimated paraxial beam required of a desired hologram;
  deriving from said deviation the principal replay mode co-ordinates for said desired hologram.

24. The method of claim 22 wherein said step of evaluating comprises:

converting said co-ordinates to rational numbers each comprising a numerator and a denominator, wherein said rational numbers are simplified so that said denominators have their lowest integer values, and using said denominators as the number of pixels for said base cell pattern.

25. The method of claim 24, and further comprising constraining said numerator and denominator by a predetermined mathematical relationship.

26. The method of claim 25 wherein said mathematical relationship is specified by $$-\tfrac{1}{2}D_x \leq N_x \leq \tfrac{1}{2}D_x \; -\tfrac{1}{2}D_y \; 1 \leq D_x \leq R_x \; 1 \leq D_y \leq R_y$$

where $N_x$, $N_y$ are said numerators $D_x$, $D_y$ are said denominators, and $(R_x, R_y)$ represent the resolution in number of pixels of the hologram device.

27. The method of claim 25, wherein said evaluating step comprises defining a spatially sampled phase screen $\Phi$ using said rational numbers such that $$\phi(k, l) = k\frac{N_x}{D_x} + l\frac{N_y}{D_y}$$

wherein f is the phase screen, k=0,1,2 ... ($D_x$-1) l=0,1, 2 ... ($D_y$-1), and $N_x$, $N_y$ are said numerators and $D_x$, $D_y$ are said denominators.

28. The method of claim 27 wherein said evaluating step further comprises:

phase-quantizing said phase screen to said predetermined number of uniformly distributed phase levels using $$\phi_s(k,l)=\exp(2\pi j \times int\{\Phi(k,l)\times\Psi\}/\Psi)$$

where $\phi_s(k,l)$ is the final sampled and quantized representation of the base-cell pattern for the target hologram device, $\psi$ is the number of phase levels supported, j is the complex operator $(-1)^{1/2}$, exp ( ... ) is the exponential operator, and int { ... } is a quantization function that rounds its argument to the nearest integer towards minus infinity.

29. A method of operating an optical switch comprising an input optical fiber array and a receiver array, and an optical system connecting the input optical fiber array to the receiver array wherein the optical system comprises a first binary reconfigurable spatial light modulator, a second binary reconfigurable spatial light modulator, each spatial light modulator being adapted for providing a respective selectable set of holograms each for a desired switching operation, and a pair of lenses between said first and second binary reconfigurable spatial light modulators for defining therebetween an interconnect region, wherein each spatial light modulator comprises a display screen, memory circuitry for a plurality of sets of hologram data and selection circuitry for selecting one of said sets according to a desired switching function, each stored set of hologram data being calculated by:

determining principal replay co-ordinates of a said hologram according to a desired switching function; using said co-ordinates, calculating the size in pixels of a base cell; and evaluating a base cell pattern by a phase-quantization procedure; and replicating said base cell pattern data until the entire aperture of the spatial light modulator is filled, the method comprising:

scrolling the hologram pattern (in either 1- or 2-dimensions as appropriate) across the display device by one or more pixels at a time and at regular intervals.

30. A method of operating an optical switch comprising an input optical fiber array and a receiver array, and an optical system connecting the input optical fiber array to the receiver array wherein the optical system comprises a first ferroelectric liquid crystal spatial light modulator, a second ferroelectric liquid crystal spatial light modulator, each spatial light modulator being adapted for providing a respective selectable set of holograms each for a desired switching operation, and a pair of lenses between said first and second ferroelectric liquid crystal spatial light modulators for defining therebetween an interconnect region, wherein each spatial light modulator comprises a display screen, memory circuitry for a plurality of sets of hologram data and selection circuitry for selecting one of said sets according to a desired switching function, each stored set of hologram data being calculated by:

determining principal replay co-ordinates of a said hologram according to a desired switching function; using said co-ordinates, calculating the size in pixels of a base cell; and evaluating a base cell pattern by a phase-quantization procedure; and replicating said base cell pattern data until the entire aperture of the spatial light modulator is filled, the method comprising:

scrolling the hologram pattern (in either 1- or 2-dimensions as appropriate) across the display device by one or more pixels at a time and at regular intervals.

* * * * *